US012768927B2

(12) United States Patent
Manolakos et al.

(10) Patent No.: US 12,768,927 B2
(45) Date of Patent: Oct. 20, 2026

(54) PROCESSING CAPABILITIES AND MEASUREMENT PERIOD FORMULATION WITH MULTIPLE RECEPTION-TRANSMISSION TIMING ERROR GROUP (TEG) MEASUREMENTS

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 18/559,493

(22) PCT Filed: Jul. 6, 2022

(86) PCT No.: PCT/US2022/073465
§ 371 (c)(1),
(2) Date: Nov. 7, 2023

(87) PCT Pub. No.: WO2023/009931
PCT Pub. Date: Feb. 2, 2023

(65) Prior Publication Data
US 2024/0230820 A1 Jul. 11, 2024

(30) Foreign Application Priority Data
Jul. 29, 2021 (IN) ............................. 202141034060

(51) Int. Cl.
*G01S 5/00* (2006.01)
*G01S 5/02* (2010.01)
*H04W 64/00* (2009.01)

(52) U.S. Cl.
CPC .......... *G01S 5/0054* (2013.01); *G01S 5/0236* (2013.01); *H04W 64/006* (2013.01)

(58) Field of Classification Search
CPC ... H04W 24/10; H04W 24/08; H04W 64/006; H04W 4/02; H04W 64/003; H04W 8/24;
(Continued)

(56) References Cited

U.S. PATENT DOCUMENTS 11,889,461 B2 1/2024 Bao et al.
2014/0349582 A1 11/2014 Xiao et al.
(Continued)

FOREIGN PATENT DOCUMENTS

WO 2022081630 A1 4/2022
WO 2022216353 10/2022
(Continued)

OTHER PUBLICATIONS

Intel Corporation: "Details of UE/gNB RX/TX Timing Errors Mitigation", 3GPP TSG RAN WG1 #106e, R1-2107590, e-Meeting, Aug. 16-27, 2021, pp. 1-8.
(Continued)

*Primary Examiner* — Kwasi Karikari
(74) *Attorney, Agent, or Firm* — Muncy, Geissler, Olds & Lowe, P.C.

(57) ABSTRACT

Disclosed are techniques for wireless positioning. In an aspect, a network node receives, from a location server, a request location information message indicating that the network node is expected to report at least one positioning measurement of at least one positioning reference signal (PRS) resource for each of a plurality of timing error groups (TEGs) of the network node, performs the at least one positioning measurement of the at least one PRS resource for each of the plurality of TEGs over one or more repetitions of the at least one PRS resource based on a capability
(Continued)

of the network node to perform simultaneous TEG processing of PRS resources, and transmits, to the location server, a provide location information message including at least the plurality of TEGs and the at least one positioning measurement associated with each of the plurality of TEGs.

31 Claims, 13 Drawing Sheets

(58) Field of Classification Search
CPC ... H04W 92/18; H04W 72/25; H04W 56/004; H04W 56/0055; H04W 56/0065; H04W 8/22; H04W 4/025; H04W 72/21; H04W 56/0045; H04W 72/02; H04W 88/18; H04W 72/23; H04W 24/02; H04W 48/12; H04W 72/51; H04W 72/512; H04W 36/00692; H04W 56/005; H04W 60/04; H04W 52/42; H04W 56/0015
See application file for complete search history.

(56) References Cited

U.S. PATENT DOCUMENTS

| | | | | |
|---|---|---|---|---|
| 2020/0351814 | A1* | 11/2020 | Manolakos | G01S 5/14 |
| 2021/0266773 | A1 | 8/2021 | Lee et al. | |
| 2022/0053435 | A1* | 2/2022 | King | H04W 56/0005 |
| 2022/0252690 | A1* | 8/2022 | Zhou | H04W 56/004 |
| 2022/0357420 | A1* | 11/2022 | Zhou | G01S 5/0036 |
| 2022/0390546 | A1 | 12/2022 | Cha et al. | |
| 2023/0224848 | A1 | 7/2023 | Dong | |
| 2023/0388959 | A1* | 11/2023 | Hasegawa | G01S 5/0036 |
| 2024/0121751 | A1 | 4/2024 | Bao | |
| 2024/0183928 | A1* | 6/2024 | Ernström | G01S 5/0244 |

FOREIGN PATENT DOCUMENTS

| | | |
|---|---|---|
| WO | 2023009931 | 2/2023 |
| WO | 2023010398 A1 | 2/2023 |

OTHER PUBLICATIONS

Mediatek Inc: "Mitigation of RX/TX timing delays for higher accuracy", 3GPP TSG-RAN WG1 #105-e, R1-2105759, 3rd Generation Partnership Project, Mobile Competence Centre, 650, Route Des Lucioles, F-06921 Sophia-Antipolis Cedex, France, vol. RAN WG1, No. e-meeting, May 10, 2021-May 27, 2021, May 12, 2021, 8 Pages, XP052011684.

Mediatek Inc: "Mitigation of RX/TX Timing Delays for Higher Accuracy", 3GPP TSG-RAN WG1 #106-e, R1-2107822, e-Meeting, Aug. 16-Aug. 27, 2021, 13 pages.

Moderator (Catt) : "FL Summary #2 for Accuracy Improvements by Mitigating UE Rx/Tx and/or gNB Rx/Tx Timing Delays", R1-2108242, 3rd Generation Partnership Project, Mobile Competence Centre, 650, Route Des Lucioles, F-06921 Sophia-Antipolis Cedex, France, vol. RAN WG1, No. e-meeting, Aug. 16, 2021-Aug. 27, 2021, Aug. 20, 2021, 75 Pages, XP052041736.

Moderator(Catt): "FL Summary #4 for Accuracy Improvements by Mitigating UE Rx/Tx and/or gNB Rx/Tx Timing Delays", 3GPP TSG RAN WG1 Meeting #104bis-e, R1-2103992, 3rd Generation Partnership Project, Mobile Competence Centre, 650, Route Des Lucioles, F-06921 Sophia-Antipolis Cedex, France, vol. RAN WG1, No. e-meeting, Apr. 12, 2021-Apr. 20, 2021, Apr. 20, 2021, XP051996599, 85 Pages, section 2/Agreement, section 3/Submitted, Proposals (specific for UL positioning).

Oppo: "Enhancement of Timing-based Positioning by Mitigating UE Rx/Tx and/or gNB Rx/Tx Timing Delays", 3GPP TSG RAN WG1 #106-e, R1-2107213, e-Meeting, Aug. 16-27, 2021, 11 pages.

Vivo: "Discussion on Methods for Rx/Tx Timing Delay Mitigating", 3GPP TSG RAN WG1 #104b-e, R1-2102526, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, XP051993130, 15 Pages, Sections 1-6.

Vivo: "Discussion on Methods for Rx/Tx Timing Delay Mitigating", 3GPP TSG RAN WG1 #106-e, R1-2106595, e- Meeting, Aug. 16-27, 2021, 17 pages.

ZTE: "Positioning Accuracy Improvement by Mitigating Timing Delay", 3GPP TSG RAN WG1 Meeting #106-e, R1-2106549, e-Meeting, Aug. 16-Aug. 27, 2021, pp. 1-10.

Ericsson: "Techniques Mitigating Rx/Tx Timing Delays", 3GPP TSG-RAN WG1 Meeting #104bis-e, R1-2103735, 3rd Generation Partnership Project, Mobile Competence Centre, 650, Route Des Lucioles, F-06921, Sophia-Antipolis Cedex, France, vol. RAN WG1, No. e-Meeting, Apr. 12, 2021-Apr. 20, 2021, Apr. 6, 2021, 38 Pages, XP052177307.

Ericsson: "Techniques Mitigating Rx/Tx Timing Delays", 3GPP TSG-RAN WG1 Meeting #106-bis-e, R1-2110349, 3rd Generation Partnership Project, Mobile Competence Centre, 650, Route Des Lucioles, F-06921 Sophia-Antipolis Cedex, France vol. RAN WG1, No. e-Meeting, Oct. 11, 2021-Oct. 19, 2021, Oct. 1, 2021, 36 Pages, XP052059282.

International Search Report and Written Opinion—PCT/US2022/073465—ISA/EPO—Dec. 15, 2022.

Qualcomm Incorporated: "Enhancements on Timing Error Mitigations for Improved Accuracy", 3GPP TSG RAN WG1 #106-e, R1-2107345, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 6, 2021, 17 Pages, XP052038293, Section 3, p. 1.

* cited by examiner

PROCESSING CAPABILITIES AND MEASUREMENT PERIOD FORMULATION WITH MULTIPLE RECEPTION-TRANSMISSION TIMING ERROR GROUP (TEG) MEASUREMENTS

CROSS-REFERENCE TO RELATED APPLICATIONS

The present Application for Patent claims priority to Indian Patent Application No. 202141034060, entitled "PROCESSING CAPABILITIES AND MEASUREMENT PERIOD FORMULATION WITH MULTIPLE RECEPTION-TRANSMISSION TIMING ERROR GROUP (TEG) MEASUREMENTS," filed Jul. 29, 2021, and is a national stage application, filed under 35 U.S.C. § 371, of International Patent Application No. PCT/US2022/073465, entitled "PROCESSING CAPABILITIES AND MEASUREMENT PERIOD FORMULATION WITH MULTIPLE RECEPTION-TRANSMISSION TIMING ERROR GROUP (TEG) MEASUREMENTS," filed Jul. 6, 2022, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a network node includes receiving, from a location server, a request location information message indicating that the network node is expected to report at least one positioning measurement of at least one positioning reference signal (PRS) resource for each of a plurality of timing error groups (TEGs) of the network node; performing the at least one positioning measurement of the at least one PRS resource for each of the plurality of TEGs over one or more repetitions of the at least one PRS resource based on a capability of the network node to perform simultaneous TEG processing of PRS resources; and transmitting, to the location server, a provide location information message including at least the plurality of TEGs and the at least one positioning measurement associated with each of the plurality of TEGs.

In an aspect, a network node includes a memory; at least one transceiver; and at least one processor communicatively coupled to the memory and the at least one transceiver, the at least one processor configured to: receive, via the at least one transceiver, from a location server, a request location information message indicating that the network node is expected to report at least one positioning measurement of at least one positioning reference signal (PRS) resource for each of a plurality of timing error groups (TEGs) of the network node; perform the at least one positioning measurement of the at least one PRS resource for each of the plurality of TEGs over one or more repetitions of the at least one PRS resource based on a capability of the network node to perform simultaneous TEG processing of PRS resources; and transmit, via the at least one transceiver, to the location server, a provide location information message including at least the plurality of TEGs and the at least one positioning measurement associated with each of the plurality of TEGs.

In an aspect, a network node includes means for receiving, from a location server, a request location information message indicating that the network node is expected to report at least one positioning measurement of at least one positioning reference signal (PRS) resource for each of a plurality of timing error groups (TEGs) of the network node; means for performing the at least one positioning measurement of the at least one PRS resource for each of the plurality of TEGs over one or more repetitions of the at least one PRS resource based on a capability of the network node to perform simultaneous TEG processing of PRS resources; and means for transmitting, to the location server, a provide location information message including at least the plurality of TEGs and the at least one positioning measurement associated with each of the plurality of TEGs.

In an aspect, a non-transitory computer-readable medium storing computer-executable instructions that, when executed by a network node, cause the network node to: receive, from a location server, a request location information message indicating that the network node is expected to report at least one positioning measurement of at least one positioning reference signal (PRS) resource for each of a plurality of timing error groups (TEGs) of the network node; perform the at least one positioning measurement of the at least one PRS resource for each of the plurality of TEGs over one or more repetitions of the at least one PRS resource based on a capability of the network node to perform simultaneous TEG processing of PRS resources; and transmit, to the location server, a provide location information message including at least the plurality of TEGs and the at least one positioning measurement associated with each of the plurality of TEGs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
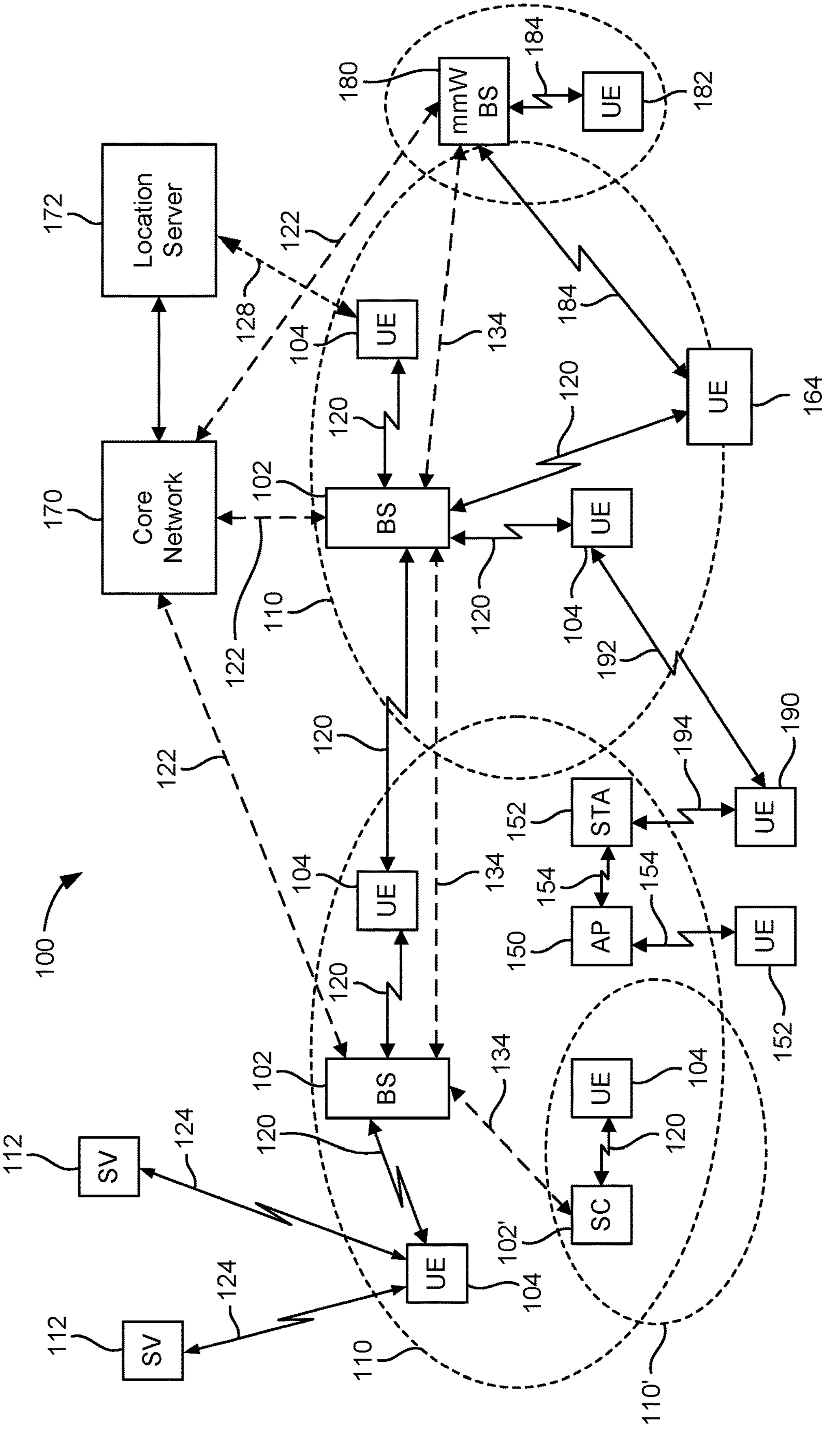
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, frequency band, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this (frequency) band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
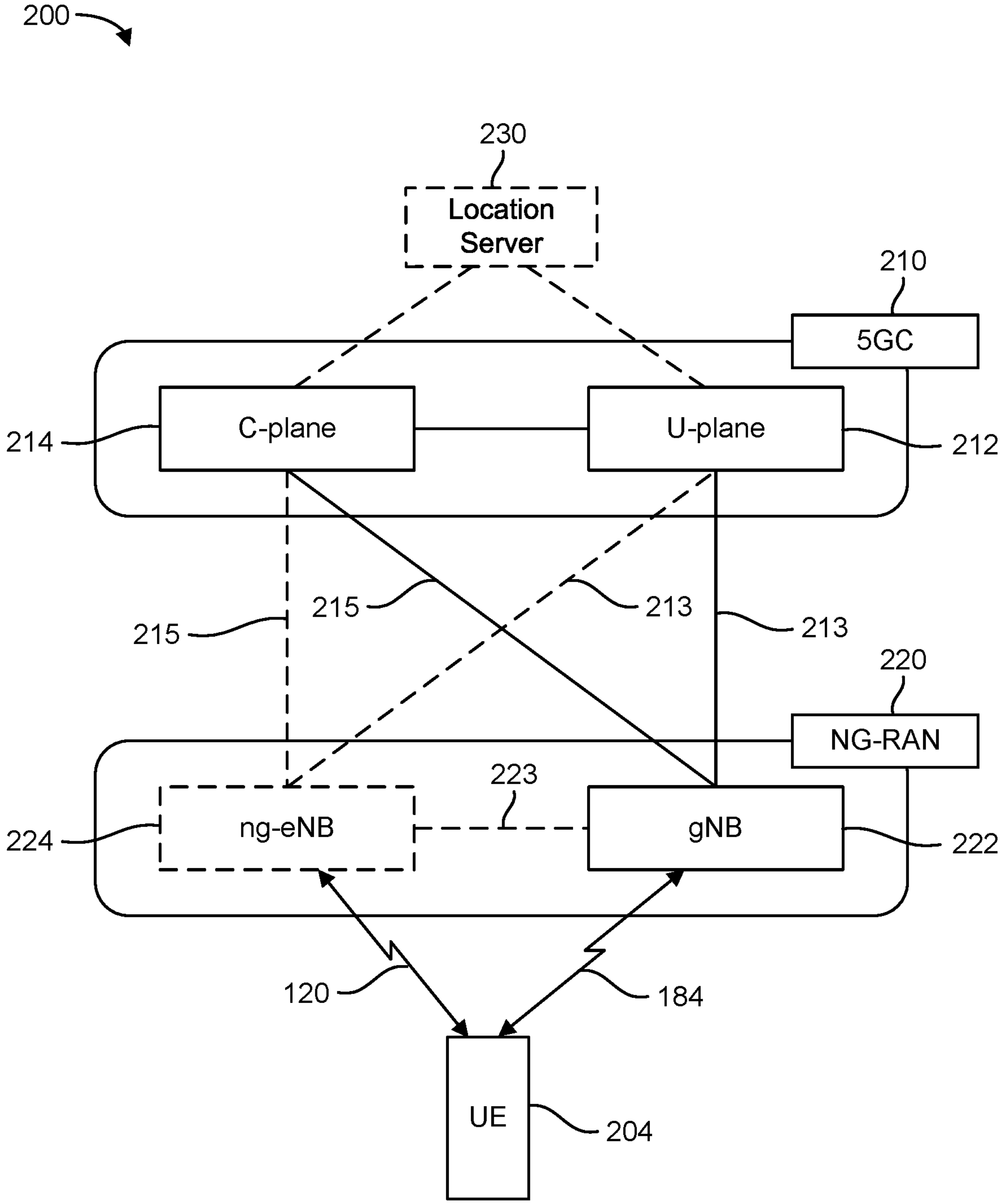
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
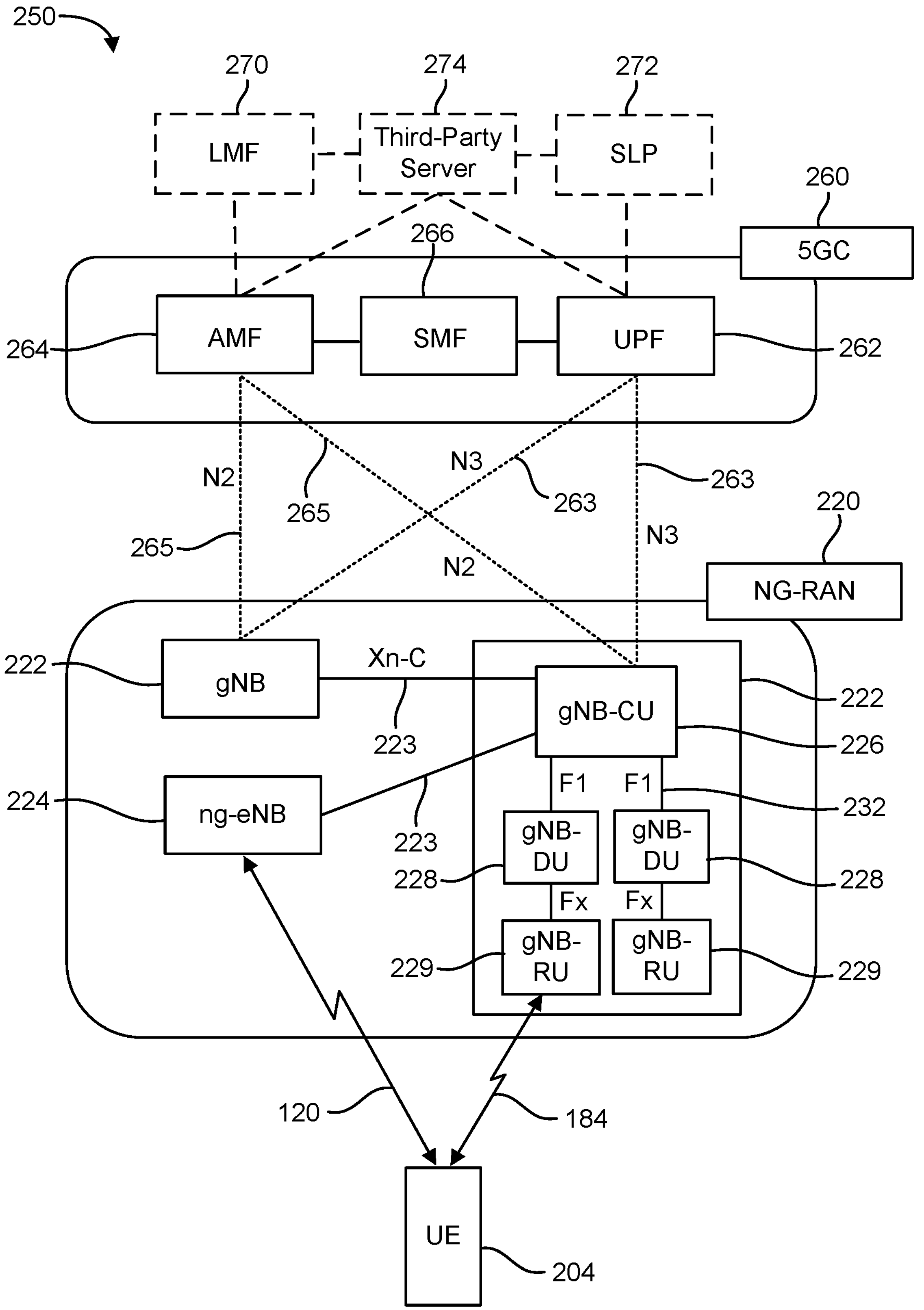

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
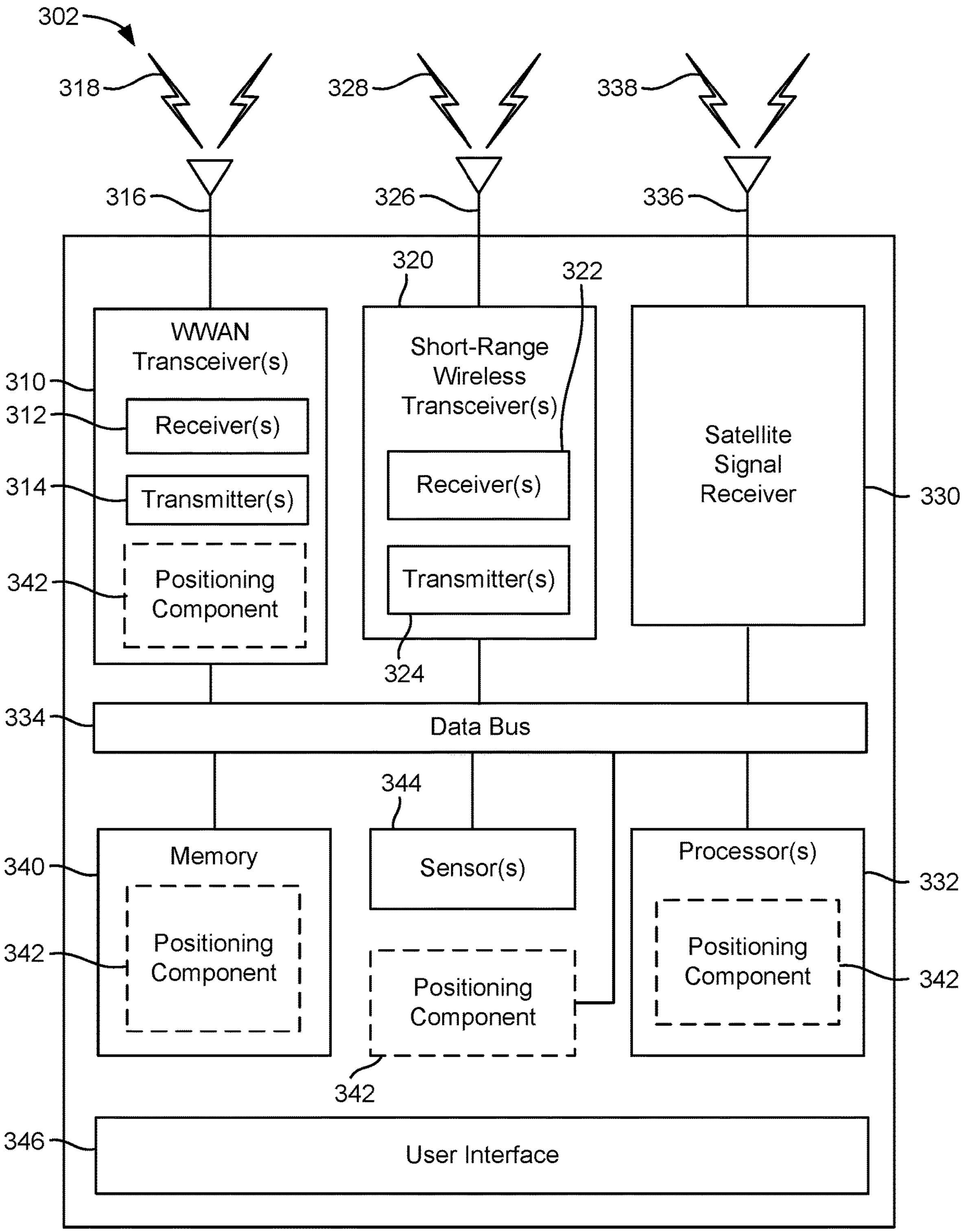
FIGS. 3A, 3B, and 3C are simplified block diagrams of several sample aspects of components that may be employed in a user equipment (UE), a base station, and a network entity, respectively, and configured to support communications as taught herein.
Figure 3B:
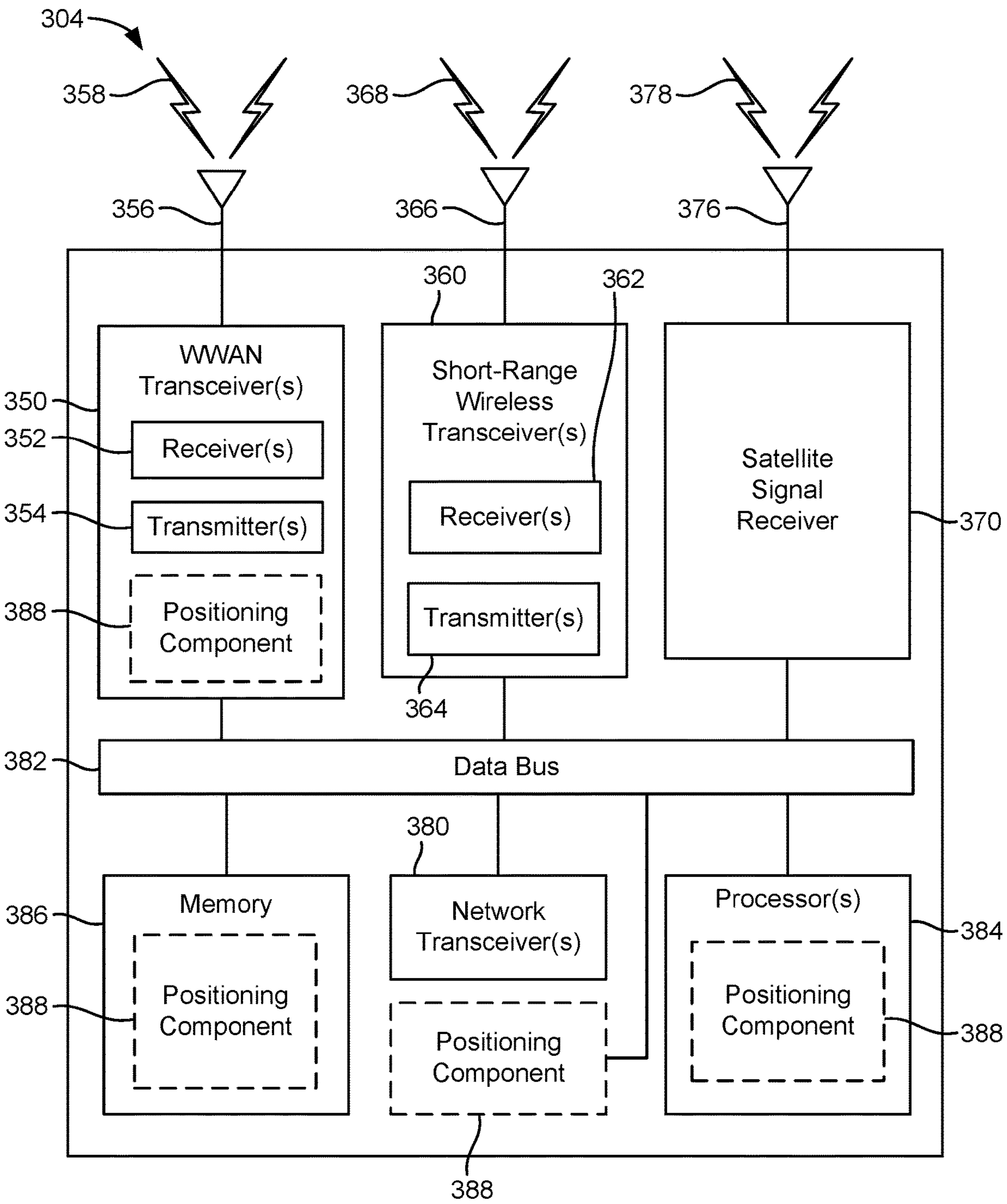
Figure 3C:
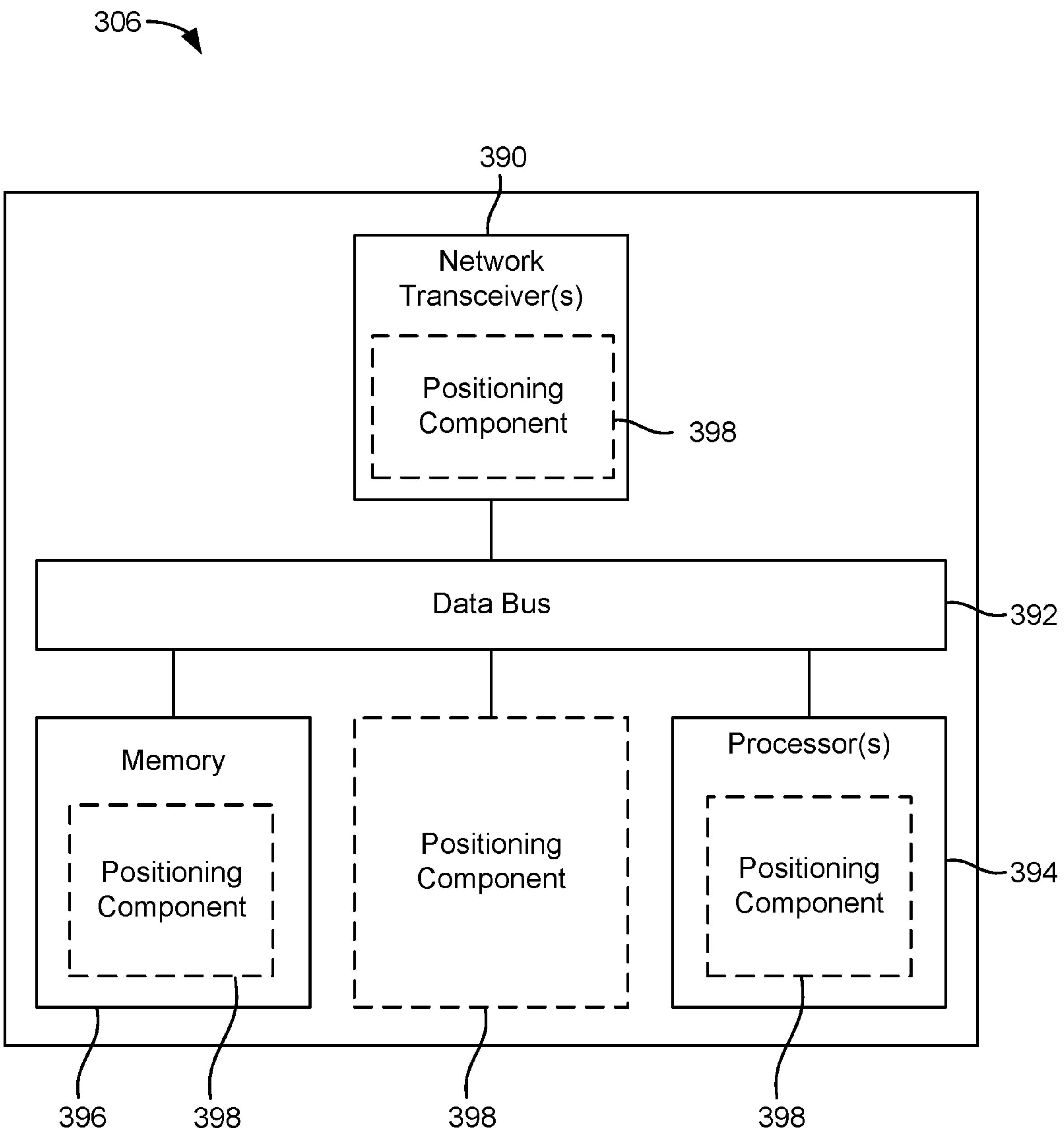

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
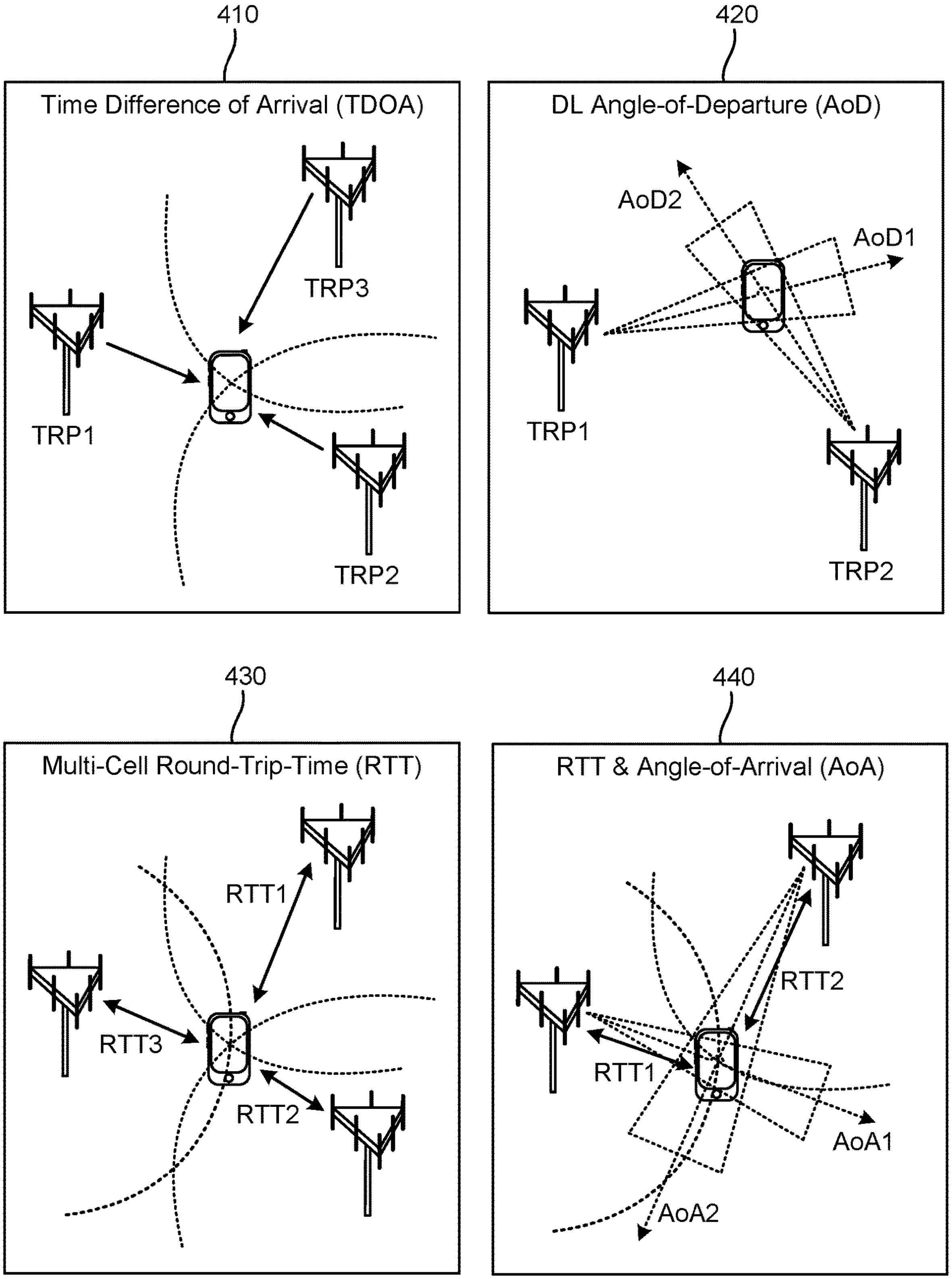
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round-trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
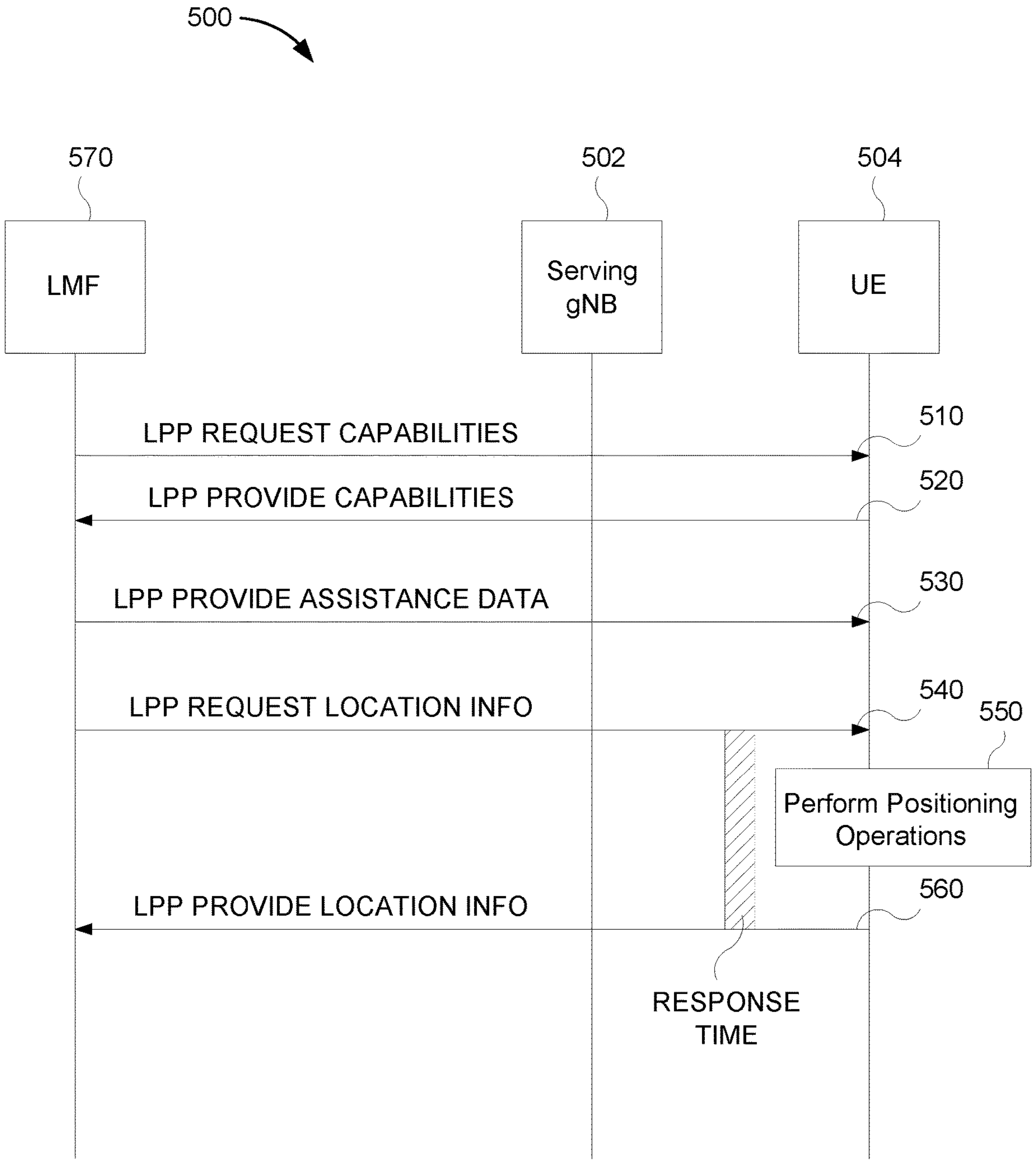
FIG. 5 illustrates an example Long-Term Evolution (LTE) positioning protocol (LPP) call flow between a UE and a location server for performing positioning operations.

FIG. 5 illustrates an example Long-Term Evolution (LTE) positioning protocol (LPP) procedure 500 between a UE 504 and a location server (illustrated as a location management function (LMF) 570) for performing positioning operations. As illustrated in FIG. 5, positioning of the UE 504 is supported via an exchange of LPP messages between the UE 504 and the LMF 570. The LPP messages may be exchanged between UE 504 and the LMF 570 via the UE's 504 serving base station (illustrated as a serving gNB 502) and a core network (not shown). The LPP procedure 500 may be used to position the UE 504 in order to support various location-related services, such as navigation for UE 504 (or for the user of UE 504), or for routing, or for provision of an accurate location to a public safety answering point (PSAP) in association with an emergency call from UE 504 to a PSAP, or for some other reason. The LPP procedure 500 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 504 may receive a request for its positioning capabilities from the LMF 570 at stage 510 (e.g., an LPP Request Capabilities message). At stage 520, the UE 504 provides its positioning capabilities to the LMF 570 relative to the LPP protocol by sending an LPP Provide Capabilities message to LMF 570 indicating the position methods and features of these position methods that are supported by the UE 504 using LPP. The capabilities indicated in the LPP Provide Capabilities message may, in some aspects, indicate the type of positioning the UE 504 supports (e.g., DL-TDOA, RTT, E-CID, etc.) and may indicate the capabilities of the UE 504 to support those types of positioning.

Upon reception of the LPP Provide Capabilities message, at stage 520, the LMF 570 determines to use a particular type of positioning method (e.g., DL-TDOA, RTT, E-CID, etc.) based on the indicated type(s) of positioning the UE 504 supports and determines a set of one or more transmission-reception points (TRPs) from which the UE 504 is to measure downlink positioning reference signals or towards which the UE 504 is to transmit uplink positioning reference signals. At stage 530, the LMF 570 sends an LPP Provide Assistance Data message to the UE 504 identifying the set of TRPs.

In some implementations, the LPP Provide Assistance Data message at stage 530 may be sent by the LMF 570 to the UE 504 in response to an LPP Request Assistance Data message sent by the UE 504 to the LMF 570 (not shown in FIG. 5). An LPP Request Assistance Data message may include an identifier of the UE's 504 serving TRP and a request for the positioning reference signal (PRS) configuration of neighboring TRPs.

At stage 540, the LMF 570 sends a request for location information to the UE 504. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 530 may be sent after the LPP Request Location Information message at 540 if, for example, the UE 504 sends a request for assistance data to LMF 570 (e.g., in an LPP Request Assistance Data message, not shown in FIG. 5) after receiving the request for location information at stage 540.

At stage 550, the UE 504 utilizes the assistance information received at stage 530 and any additional data (e.g., a desired location accuracy or a maximum response time) received at stage 540 to perform positioning operations (e.g., measurements of DL-PRS, transmission of UL-PRS, etc.) for the selected positioning method.

At stage 560, the UE 504 may send an LPP Provide Location Information message to the LMF 570 conveying the results of any measurements that were obtained at stage 550 (e.g., time of arrival (ToA), reference signal time difference (RSTD), reception-to-transmission (Rx-Tx), etc.) and before or when any maximum response time has expired (e.g., a maximum response time provided by the LMF 570 at stage 540). The LPP Provide Location Information message at stage 560 may also include the time (or times) at which the positioning measurements were obtained and the identity of the TRP(s) from which the positioning measurements were obtained. Note that the time between the request for location information at 540 and the response at 560 is the "response time" and indicates the latency of the positioning session.

The LMF 570 computes an estimated location of the UE 504 using the appropriate positioning techniques (e.g., DL-TDOA, RTT, E-CID, etc.) based, at least in part, on measurements received in the LPP Provide Location Information message at stage 560.

Figure 6:
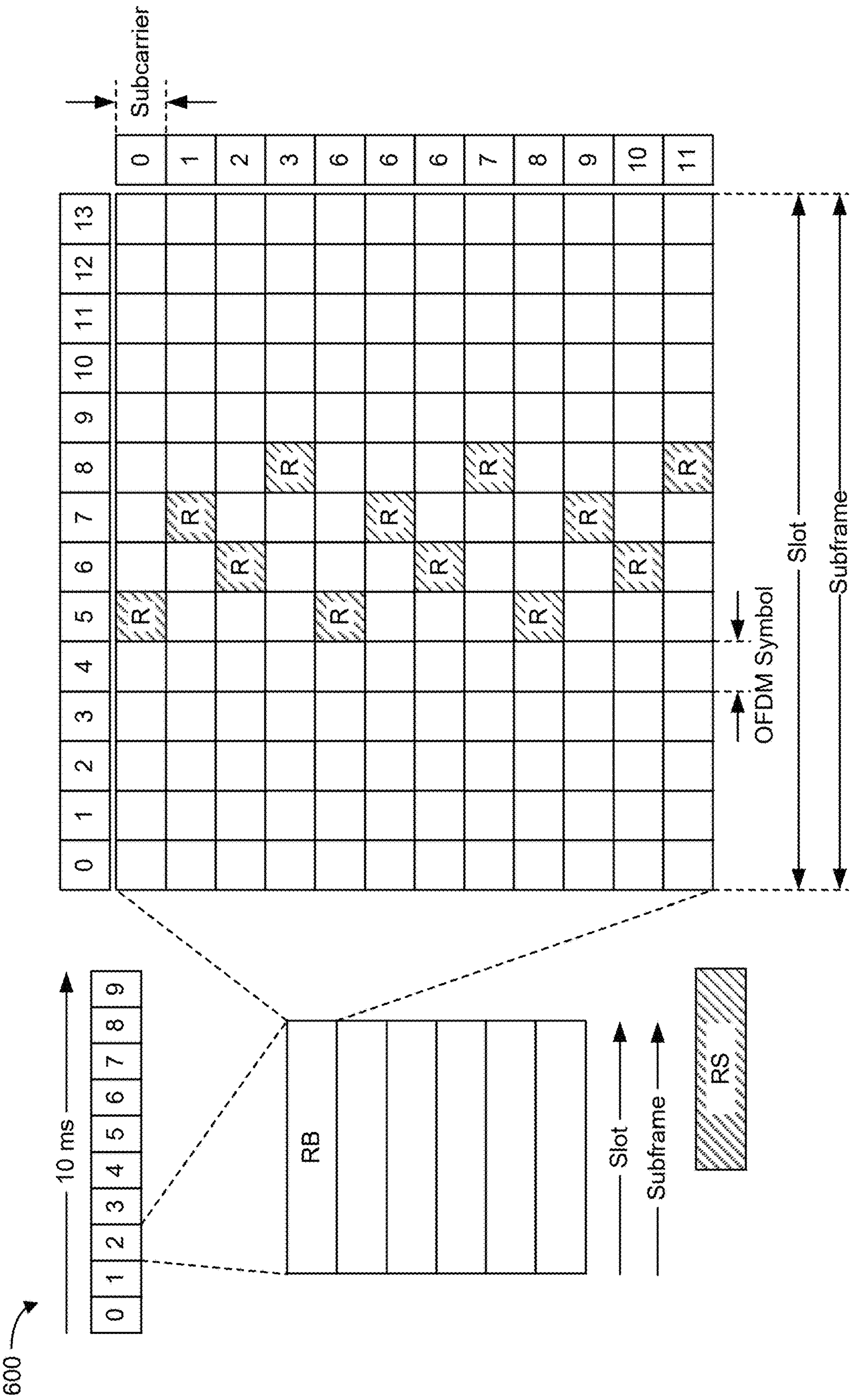
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

PRS have been defined for NR positioning to enable UEs to detect and measure more neighboring TRPs. Several configurations are supported to enable a variety of deployments (e.g., indoor, outdoor, sub-6 GHZ, mmW). In addition, PRS may be configured for both UE-based and UE-assisted positioning procedures. The following table illustrates various types of reference signals that can be used for various positioning methods supported in NR.

TABLE 1

| DL/UL Reference Signals | UE Measurements | To support the following positioning techniques |
|---|---|---|
| DL-PRS | DL-RSTD | DL-TDOA |
| DL-PRS | DL-PRS RSRP | DL-TDOA, DL-AoD, Multi-RTT |
| DL-PRS/SRS-for-positioning | UE Rx-Tx | Multi-RTT |
| SSB/CSI-RS for RRM | Synchronization Signal (SS)-RSRP (RSRP for RRM), SS-RSRQ (for RRM), CSI-RSRP (for RRM), CSI-RSRQ (for RRM) | E-CID |

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 6 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from 2^μ*{4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer" or "PFL") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

In an aspect, the reference signal carried on the REs labeled "R" in FIG. 6 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 6, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 6); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning," "positioning SRS," or the like when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 7:
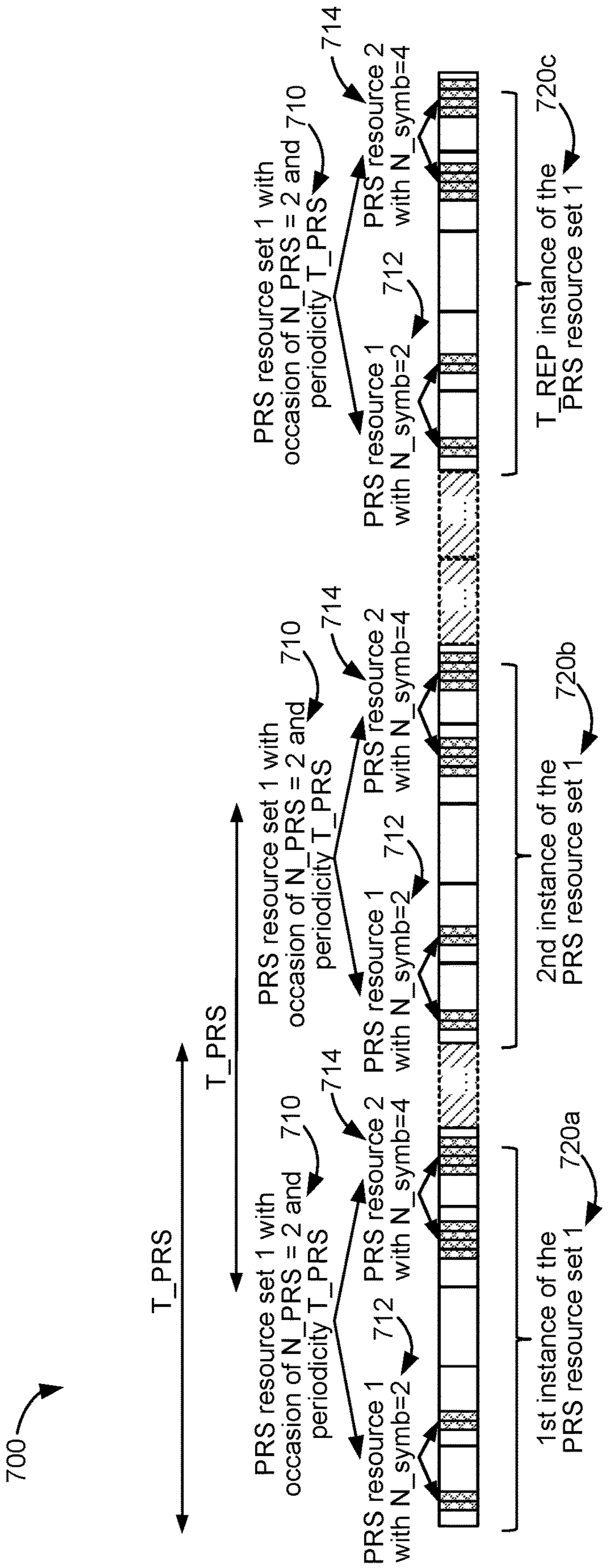
FIG. 7 is a diagram of an example positioning reference signal (PRS) configuration for the PRS transmissions of a given base station, according to aspects of the disclosure.

FIG. 7 is a diagram of an example PRS configuration 700 for the PRS transmissions of a given base station, according to aspects of the disclosure. In FIG. 7, time is represented horizontally, increasing from left to right. Each long rectangle represents a slot and each short (shaded) rectangle represents an OFDM symbol. In the example of FIG. 7, a PRS resource set 710 (labeled "PRS resource set 1") includes two PRS resources, a first PRS resource 712 (labeled "PRS resource 1") and a second PRS resource 714 (labeled "PRS resource 2"). The base station transmits PRS on the PRS resources 712 and 714 of the PRS resource set 710.

The PRS resource set 710 has an occasion length (N_PRS) of two slots and a periodicity (T_PRS) of, for example, 160 slots or 160 milliseconds (ms) (for 15 kHz subcarrier spacing). As such, both the PRS resources 712 and 714 are two consecutive slots in length and repeat every T_PRS slots, starting from the slot in which the first symbol of the respective PRS resource occurs. In the example of FIG. 7, the PRS resource 712 has a symbol length (N_symb) of two symbols, and the PRS resource 714 has a symbol length (N_symb) of four symbols. The PRS resource 712 and the PRS resource 714 may be transmitted on separate beams of the same base station.

Each instance of the PRS resource set 710, illustrated as instances 720*a*, 720*b*, and 720*c*, includes an occasion of length '2' (i.e., N_PRS=2) for each PRS resource 712, 714 of the PRS resource set. The PRS resources 712 and 714 are repeated every T_PRS slots up to the muting sequence periodicity T_REP. As such, a bitmap of length T_REP would be needed to indicate which occasions of instances 720*a*, 720*b*, and 720*c* of PRS resource set 710 are muted (i.e., not transmitted).

In an aspect, there may be additional constraints on the PRS configuration 700. For example, for all PRS resources (e.g., PRS resources 712, 714) of a PRS resource set (e.g., PRS resource set 710), the base station can configure the following parameters to be the same: (a) the occasion length (T_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

A UE reports its capability to process PRS in the capability update (e.g., an LPP Provide Capabilities message as at stage 520). The assistance data received based on the UE's capability information (e.g., in the LPP Provide Assistance Data message at stage 530) includes the information needed to perform measurements of PRS for the positioning session (e.g., the configurations of the PRS resources to measure from one or more base stations/TRPs/cells). However, the assistance data may identify significantly more PRS resources to measure than the UE is capable of processing. For example, a UE may be able to process only up to five PRS resources, whereas the PRS assistance data may identify 20 PRS resources to measure.

Currently, in such cases, the UE selects the first five PRS resources for processing. Specifically, it has been agreed that when a UE is configured in the assistance data of a positioning method with a number of PRS resources beyond its capability, the UE assumes the PRS resources in the assistance data are sorted in a decreasing order of measurement priority. According to the current structure of the assistance data, the following priority is assumed: the 64 TRPs per frequency layer are sorted according to priority and the two PRS resource sets per TRP of the frequency layer are sorted according to priority. The four frequency layers may or may not be sorted according to priority and the 64 PRS resources of the PRS resource set per TRP per frequency layer may or may not be sorted according to priority. Note that the reference PRS resource indicated by the "nr-DL-PRS-ReferenceInfo-r16" LPP information element for each frequency layer has the highest priority, at least for DL-TDOA.

A UE is expected to report one or more measurement instances (of RSTD, downlink RSRP, and/or UE Rx-Tx time difference measurements) in a single measurement report (e.g., in the LPP Provide Location Information message at stage 560) to the location server for UE-assisted positioning (there is no such reporting for UE-based positioning). Each UE measurement instance can be configured with 'N' (including N=1) instances of a DL-PRS resource set. Similarly, a TRP is expected to report one or more measurement instances (of relative ToA (RTOA), uplink RSRP, and/or base station Rx-Tx time difference measurements) in a single measurement report to the location server (e.g., via NR positioning protocol type A (NRPPa)). Each measurement instance is reported with its own timestamp, and the measurement instances may be within a (configured) measurement window. Each TRP measurement instance can be configured with 'M' (including M=1) SRS measurement time occasions. Note that a measurement instance refers to one or more measurements, which can either be the same or different types, and which are obtained from the same DL-PRS resource(s) or the same SRS resource(s).

Each measurement instance is also reported with its own timing error to enable the positioning entity to compensate for the timing error, or to determine an uncertainty based on the timing error. The following definitions are used for the purpose of describing internal timing errors:

Transmit (Tx) timing error: From a signal transmission perspective, there is a time delay from the time when the digital signal is generated at the baseband to the time when the RF signal is transmitted from the transmit antenna. For supporting positioning, the UE/TRP may implement an internal calibration/compensation of the transmit time delay for the transmission of the DL-PRS/UL-SRS, which may also include the calibration/compensation of the relative time delay between different RF chains in the same UE/TRP. The compensation may also consider the offset of the transmit antenna phase center to the physical antenna center. However, the calibration may not be perfect. The remaining transmit time delay after the calibration, or the uncalibrated transmit time delay is defined as the "transmit timing error" or "Tx timing error."

Receive (Rx) timing error: From a signal reception perspective, there is a time delay from the time when the RF signal arrives at the Rx antenna to the time when the signal is digitized and time-stamped at the baseband. For supporting positioning, the UE/TRP may implement an internal calibration/compensation of the Rx time delay before it reports the measurements that are obtained from the DL-PRS/SRS, which may also include the calibration/compensation of the relative time delay between different RF chains in the same UE/TRP. The compensation may also consider the offset of the Rx antenna phase center to the physical antenna center. However, the calibration may not be perfect. The remaining Rx time delay after the calibration, or the uncalibrated Rx time delay, is defined as the "Rx timing error."

UE Tx timing error group (TEG): A UE Tx TEG (or TxTEG) is associated with the transmissions of one or more SRS resources for the positioning purpose, which have the Tx timing errors within a certain margin (e.g., within a threshold of each other).

TRP Tx TEG: A TRP Tx TEG (or TxTEG) is associated with the transmissions of one or more DL-PRS resources, which have the Tx timing errors within a certain margin.

UE Rx TEG: A UE Rx TEG (or RxTEG) is associated with one or more downlink measurements, which have the Rx timing errors within a certain margin.

TRP Rx TEG: A TRP Rx TEG (or RxTEG) is associated with one or more uplink measurements, which have the Rx timing errors within a margin.

UE Rx-Tx TEG: A UE Rx-Tx TEG (or RxTxTEG) is associated with one or more UE Rx-Tx time difference measurements, and one or more SRS resources for the positioning purpose, which have the Rx timing errors plus Tx timing errors within a certain margin.

TRP Rx-Tx TEG: A TRP Rx-Tx TEG (or RxTxTEG) is associated with one or more TRP Rx-Tx time difference measurements and one or more DL-PRS resources, which have the Rx timing errors plus Tx timing errors within a certain margin.

For mitigating UE Tx/Rx timing errors for downlink-and-uplink-based positioning methods, it has been agreed that a UE may support, up to the UE's capability, one or both of the following options: (1) reporting of UE RxTxTEG ID is supported by the UE or (2) reporting of UE RxTxTEG ID is not supported by the UE but reporting of Rx TEG ID and Tx TEG ID is supported. In either option, a Tx TEG ID is associated with an SRS resource for positioning corresponding to the transmit timing of the UE's Rx-Tx time difference measurement, the transmit timing of the UE's Rx-Tx time difference measurement, or one or more SRS resources for positioning. An Rx TEG ID is associated with one or more DL-PRS resources corresponding to the receive time of the measurement.

For mitigating UE transmit timing errors for UL-TDOA, it has been agreed that one of the following options should be supported: (1) subject to the UE's capability, support a UE providing the association information of SRS resources for positioning with Tx TEGs directly to the location server if the UE has multiple Tx TEGs, or, (2) subject to the UE's capability, support a UE providing the association information of SRS resources for positioning with Tx TEGs to the serving base station if the UE has multiple Tx TEGs. In the second option, the serving base station would forward the association information provided by the UE to the location server. The involved base station(s) should also report the associated SRS resource ID and SRS resource set ID of the RTOA measurement to the location server.

There are various motivations for the techniques of the present disclosure. For example, from the current agreements, it can be seen that there is a move towards performing the same PRS resource measurements with multiple Rx and Tx TEGs. There is an option to provide these multiple TEG measurements for the same PRS resources through the "nr-AdditionalPathList-r16" LPP information element. Currently, a UE can report a maximum of three additional paths (e.g., measurements associated with three additional paths of a PRS resource). In the future, this may be changed to support the reporting of more TEGs.

As another motivation, there is expected to be support for reporting the UE's Rx TEG in the main measurement report as well as in the additional measurement report (i.e., the measurement report containing the additional measurements). As yet another motivation, not all UEs may have the same capability to process all the TEG combinations in the same measurement occasions. As such, there should be new capabilities for UE TEG processing.

Figure 8:
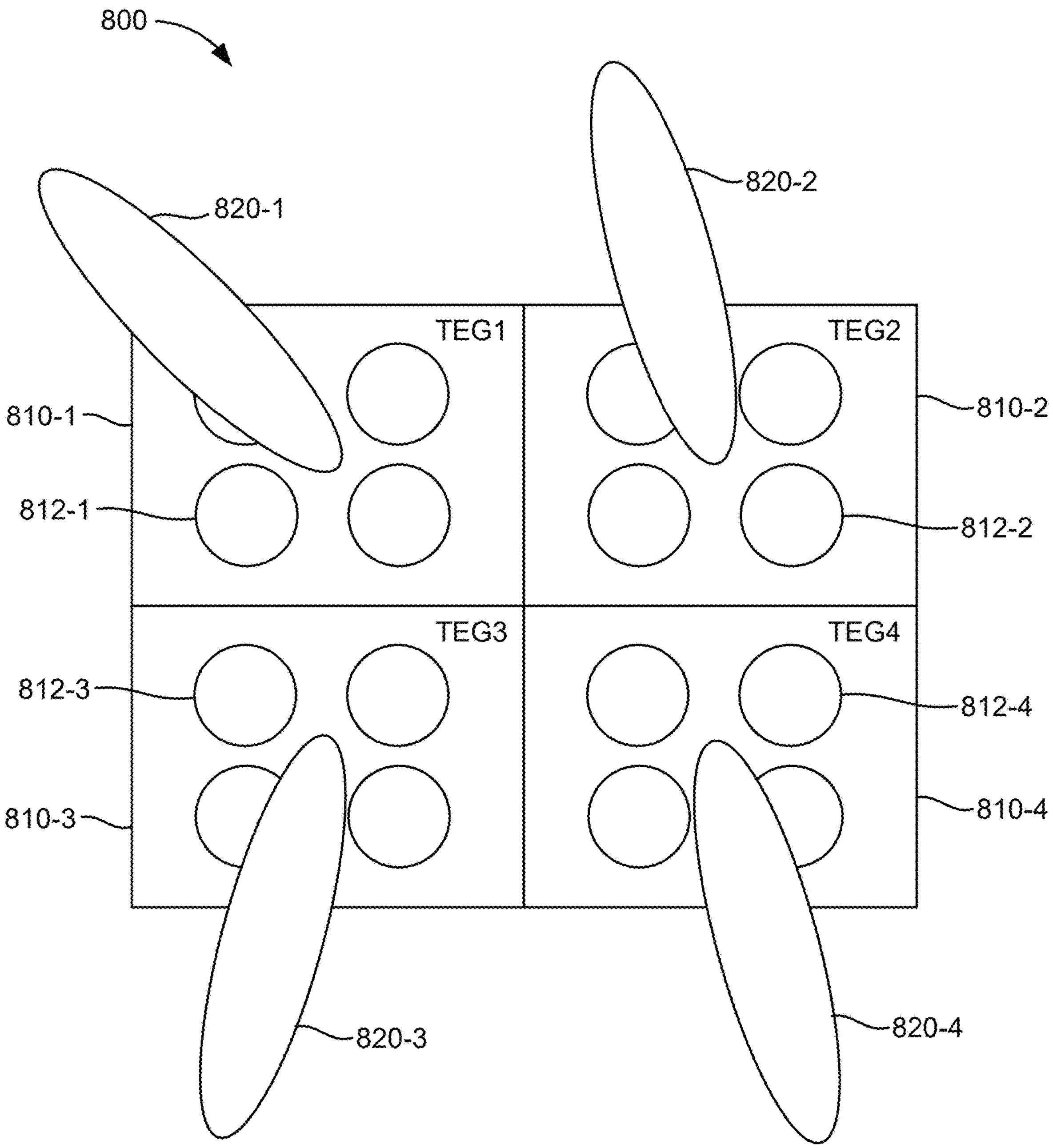
FIG. 8 illustrates an example antenna for illustrating transmit (Tx) and receive (Rx) timing error groups (TEGs), according to aspects of the disclosure.

FIG. 8 illustrates an example antenna 800 for illustrating Tx and Rx TEGs, according to aspects of the disclosure. The antenna 800 may be an antenna of a base station (e.g., any of the base stations described herein) or a UE (e.g., any of the UEs described herein). In the example of FIG. 8, the antenna 800 has four antenna panels 810-1, 810-2, 810-3, and 810-4 (collectively, antenna panels 810). Each antenna panel has four antenna elements 812-1, 812-2, 812-3, and 812-4 (collectively, antenna elements 812).

Each antenna panel 810 is capable of forming a receive and/or transmit beam in some predefined bore directions. In the example of FIG. 8, the antenna panel 810-1 forms a beam 820-1 (transmit or receive), the antenna panel 810-2 forms a beam 820-2 (transmit or receive), the antenna panel 810-3 forms a beam 820-3 (transmit or receive), and the antenna panel 810-4 forms a beam 820-4 (transmit or receive). As will be appreciated, the antenna panels 810 may not all form beams simultaneously as shown in FIG. 8. As an example, the antenna 800 may be the antenna of a UE, the beams 820 may be downlink receive beams, and the UE may be attempting to receive the same (or different) PRS resource (s) on the beams 820.

Where the antenna 800 is a UE antenna, each antenna panel 810 is connected to its own uplink transmit chain and/or downlink receive chain. Where the antenna 800 is a base station antenna, each antenna panel 810 is connected to its own downlink transmit chain and/or uplink receive chain. An RF chain (whether receive or transmit) is a cascade of electronic components, such as amplifiers (e.g., low noise amplifiers (LNAs) for receive chains and power amplifiers (PAs) for transmit chains), filters, mixers, attenuators, and detectors, configured to receive an incoming analog signal (in the case of a receive chain) or transmit an outgoing analog signal (in the case of a transmit chain). Each receive chain is coupled to at least one antenna panel 810 on one end and an analog-to-digital converter (ADC) on the other. Each transmit chain is coupled to an antenna panel 810 on one end and a digital-to-analog converter (DAC) on the other.

Each uplink and downlink chain has its own group delay, which is the delay between a measured transmission or reception time of a signal and the actual time the signal is transmitted or received at the antenna panel. Each uplink and downlink chain also has its own processing errors, Tx timing errors, and Rx timing errors, which may be based in part on group delay. As noted above, classification of Tx and Rx timing errors into groups forms the Rx and Tx TEGs at the base station and UE sides. Thus, as shown in FIG. 8, each antenna panel 810 is associated with a TEG, labeled "TEG1" to "TEG4." As such, the measurement of a PRS resource received on beam 820-1 will be associated with TEG1, the measurement of a PRS resource (the same or different) received on beam 820-2 will be associated with TEG2, and so on.

Note that while FIG. 8 illustrates each antenna panel 810 as having a different TEG, it may be that all of the antenna panels 810 have the same TEG, or groups of antenna panels 810 may have the same TEG.

Figure 9A:
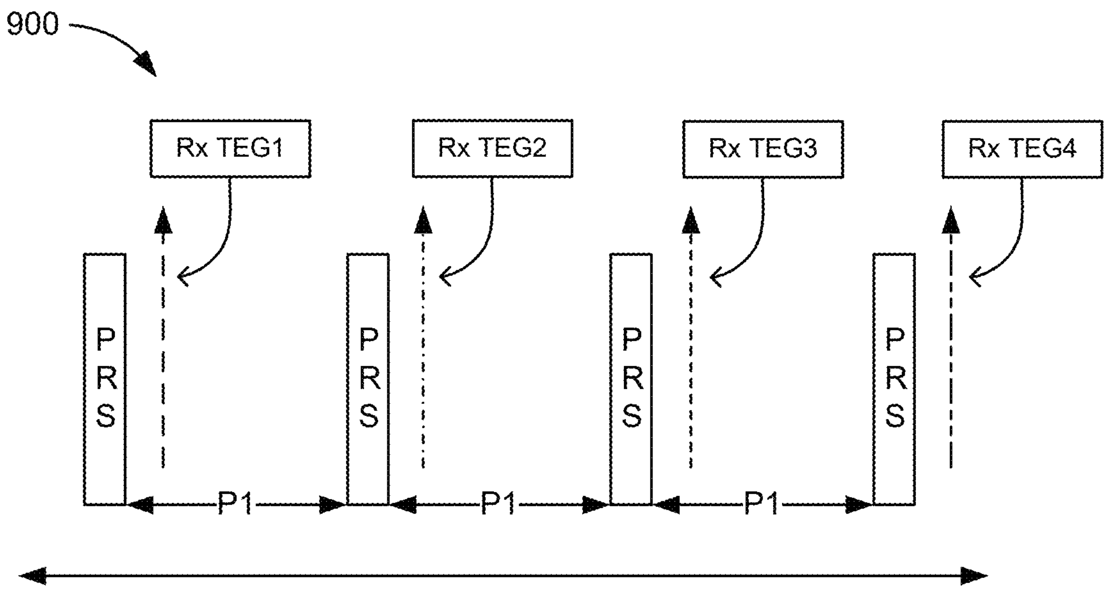
FIGS. 9A and 9B illustrate different Rx TEG processing capabilities of a UE, according to aspects of the disclosure.
Figure 9B:
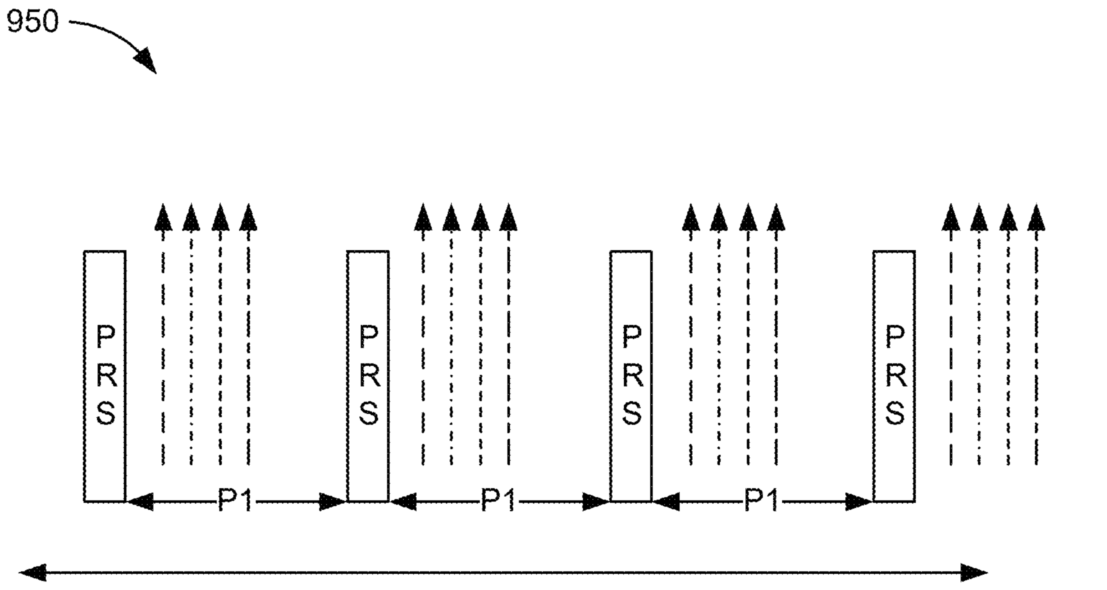

The present disclosure provides techniques for signaling a UE's processing capabilities with respect to multiple Rx/Tx TEG measurements (i.e., the Rx/Tx TEGs associated with PRS measurements, where "Rx/Tx" means Rx, Tx, or both Rx and Tx). FIGS. 9A and 9B illustrate different Rx TEG processing capabilities of a UE, according to aspects of the disclosure. In the examples of FIGS. 9A and 9B, time is represented horizontally and a PRS resource (labeled "PRS") is transmitted over at least four occasions (i.e., there are at least four repetitions of the PRS resource). In both illustrated scenarios, the UE has four Rx TEGs for processing, represented by vertical arrows and differentiated by dash type. That is, there are four Rx TEGs that may be associated with a positioning measurement of a single PRS resource. For example, as in FIG. 8, the UE may have four antenna panels, each associated with its own Rx TEG, and the UE may receive the PRS resource on each of those antenna panels. As such, each measurement of the PRS resource would be associated with a different TEG. The location server may request that the UE provide a PRS measurement of the PRS resource for each of its TEGs.

In scenario 900 of FIG. 9A, the UE has the capability to process only one Rx TEG per repetition of the PRS resource (e.g., per measurement occasion). For example, with reference to FIG. 8, the UE can only measure the PRS resource on one antenna panel 810 at a time. This may be due to RF front end limitations of the UE, UE processing power, and/or the like. In this scenario, the UE needs to perform PRS measurements for all of the TEGs in a round robin fashion. For example, with reference to FIG. 8, the UE would measure the PRS resource on each antenna panel 810 in a round robin fashion. As such, the UE will need four repetitions of the PRS resource (e.g., four measurement occasions) to complete the measurements across all four TEGs. This is illustrated by a vertical arrow representing a TEG after each PRS resource repetition. The UE can transmit the measurement report (e.g., an LPP Provide Location Information message as at stage 560) only after the four measurement occasions.

In scenario 950 of FIG. 9B, the UE has the capability to process four Rx TEGs at a given time (e.g., per measurement occasion). For example, with reference to FIG. 8, the UE can measure the PRS resource on all four antenna panels 810 at the same time. This may be due to RF front end capabilities of the UE, UE processing power, and/or the like. In this scenario, the UE is able to perform PRS measurements for all the TEGs in one measurement occasion. For example, with reference to FIG. 8, the UE would measure the PRS resource on each antenna panel 810 in one repetition of the PRS resource (e.g., one measurement occasion). As such, the UE only needs a single measurement occasion to complete the measurements across all four TEGs. This is illustrated by four vertical arrows after each PRS resource repetition, one for each TEG. In this case, the UE can transmit a measurement report (e.g., an LPP Provide Location Information message as at stage 560) after each of the four measurement occasions.

In an aspect, to inform the location server of its TEG-related capabilities, a UE can provide the following capability information to the location server (e.g., in the LPP Provide Capabilities message at stage 520): (1) the number of Rx TEGs supported per PFL, (2) the number of Tx TEGs supported per PFL, (3) the number of (Rx, Tx) TEG pairs supported per PFL, (4) the number of Rx-Tx TEGs supported per PFL, (5) the number of simultaneous processing of Rx TEG per PFL, (6) the number of simultaneous transmission of Tx TEG per PFL, (7) the number of simultaneous processing of (Rx, Tx) TEG pairs per PFL, and/or (8) the number of simultaneous processing of Rx-Tx TEGs per PFL. Note that an (Rx, Tx) TEG pair means that the Rx TEG and the Tx TEG are the same. In contrast, an Rx-Tx TEG does not indicate what the Rx TEG or the Tx TEG is, it simply provides information on the combined group delay/timing error (that includes timing error due to Rx and Tx).

Simultaneous processing of Rx/Tx TEGs means the ability of the UE to receive/transmit a PRS/SRS resource using multiple antennas (and therefore multiple Rx/Tx TEGs) in a single PRS/SRS instance (repetition). Thus, in the example of FIG. 9A, the UE cannot perform simultaneous processing of Rx TEGs and instead processes one Rx TEG per repetition. In contrast, in the example of FIG. 9B, the UE can perform simultaneous processing of Rx TEGs, specifically, four per repetition.

The present disclosure further provides techniques for determining the measurement period with respect to multiple Rx/Tx TEG measurements (i.e., the Rx/Tx TEGs associated with PRS measurements). Currently, the assumption is that a UE measures at least four "samples" of a PRS resource before reporting a positioning measurement of that PRS resource back to the network. Specifically, with respect to the standardized measurement period formulation, the assumption has been that four samples are expected to be used by the UE to derive the positioning measurement. For example, $T_{PRS\text{-}RSTD,i}$ is the measurement period for an RSTD measurement of PRS in PFL i as specified below:

$$T_{PRS-RSTD,i} = \left(CSSF_{PRS,i} * N_{RxBeam,i} * \left\lceil \frac{N_{PRS,i}^{slot}}{N'} \right\rceil \left\lceil \frac{L_{PRS,i}}{N} \right\rceil * N_{sample} - 1\right) * T_{effect,i} + T_{last}$$

In the above equation:

$N_{RxBeam,i}$ is the UE receive beam sweeping factor. In FR1, $N_{RxBeam,i}=1$, and in FR2, $N_{RxBeam,i}=8$. Note that the more receive beams, the more PRS resources the UE will need;

$CSSF_{PRS,i}$ is the carrier-specific scaling factor (CSSF) for NR PRS-based based positioning measurements in frequency layer i;

$N_{sample}$ is the number of PRS RSTD measurement samples. As noted above, currently, $N_{sample}=4$;

$T_{last}$ is the measurement duration for the last PRS RSTD sample, including the sampling time and processing time, $T_{last}=T_i+L_{PRS,i}$;

$$T_{effect,i} = \left\lceil \frac{T_i}{T_{available\_PRS,i}} \right\rceil * T_{available\_PRS,i};$$

$T_i$ corresponds to the "durationOfPRS-ProcessingSymbolsInEveryTms" LPP information element;

$T_{available\_PRS,i}=LCM(T_{PRS,i}, MGRP_i)$, the least common multiple (LCM) between $T_{PRS,i}$ and $MGRP_i$ (the "measurement gap repetition periodicity");

$T_{PRS,i}$ is the periodicity of DL-PRS resource on frequency layer i;

$L_{PRS,i}$ is a time duration;

$$N_{PRS,i}^{slot}$$

is the maximum number of DL-PRS resources in positioning frequency layer i configured in a slot;

{N, T} is the UE capability combination per (frequency) band, where N is a duration of DL-PRS symbols in milliseconds (ms) corresponding to the "durationOf-PRS-ProcessingSysmbols" LPP information element processed every T ms corresponding to the "duration-OfPRS-ProcessingSymbolsInEveryTms" LPP information element for a given maximum bandwidth supported by the UE corresponding to the "supportedBandwidthPRS" LPP information element; and N' is the UE capability for the number of DL-PRS resources that it can process in a slot as indicated by the "maxNumOfDL-PRS-ResProcessedPerSlot" LPP information element.

Note that while the foregoing is for PRS RSTD measurements, the same or similar equations and parameters are used for other types of measurements (e.g., Rx-Tx time difference measurements, RSRP measurements, etc.).

Based on the foregoing, the estimated minimum DL-PRS measurement period would be 88.5 ms, depending on the DL-PRS configuration settings. Specifically, a measurement period of 88.5 ms would be the case for one PFL in FR1, a CSSF equal to 1, $N_{RxBeam,i}$ equal to 1, $N_{sample}$ equal to 4 (RSTD measurements are performed across four PRS periods, as shown in FIG. 9A), both the PRS periodicity and the MGRP are equal to 20 ms, and the configured PRS resources are within the UE's PRS processing capability (N,T) of (0.5 ms, 8 ms). That is, in every 20 ms, the UE measures 0.5 ms of PRS, and after four repetitions of 20 ms, the UE takes 8 ms to process the measured PRS. An additional 0.5 ms is then added by the parameter $T_{last}$, resulting in a total of 88.5 ms.

With different Rx and Tx TEG processing capabilities, the UE can use different measurement periods to perform a positioning measurement. Thus, in the present disclosure, the measurement period is defined to account for Rx, Tx, and Rx/Tx TEGs. For example, if the UE has four Rx TEGs to report for a positioning measurement, then, as illustrated by the examples of FIGS. 9A and 9B, the measurement period for scenario 900 should be four times more than the measurement period for scenario 950. That is because the UE needs to measure four PRS occasions to determine the four TEGs in the scenario of FIG. 9A but only one PRS occasion in the scenario of FIG. 9B.

In an aspect, the measurement period for $T_{PRS\text{-}RSTD,i}$ can be modified as follows:

$$T_{PRS-RSTD,i} = \left(CSSF_{PRS,i} * N_{RxBeam,i} * N_{TEG,factor,i} * \left\lceil \frac{N_{PRS,i}^{slot}}{N'} \right\rceil \left\lceil \frac{L_{PRS,i}}{N} \right\rceil * N_{sample} - 1\right) * T_{effect,i} + T_{last}$$

In the above equation, for FR1, and for $N_{RxBeam,i}=1$, then $N_{TEG,factor,i}=1$ for a UE not reporting any TEG information, or a UE reporting TEG information that can also perform simultaneous processing of all of the TEGs. Alternatively, where the UE cannot perform simultaneous processing of TEGs, $N_{TEG,factor,i}=N_{TEGs}$ and $N_{TEGs}$ is the maximum number of TEGs that the UE may have (e.g., four in the example of FIG. 8, one for each antenna panel 810). In that way, the measurement period will include the number of repetitions of a PRS resource needed to measure that PRS resource, as described above with reference to FIG. 9A. Note that if a UE has N TEGs and can perform measurements using K TEGs simultaneously (where K is less than N), then $N_{TEG,factor,i}$ is based on K, such as equal to N/K.

For FR2, if $N_{RxBeam,i}=8$, then $N_{TEG,factor,i}=1$, since the UE is already measuring across all beams (up to eight instances so that inside each instance one beam is being used). That is, if the UE reports that it is using multiple (e.g., 8) receive beams per measurement period, then it means that the UE is performing simultaneous TEG processing per measurement period, and therefore, only needs one repetition of the PRS resource within a measurement period. In some cases, the UE may report/use a larger value of $N_{TEG,factor,i}$, such as $N_{TEG,factor,i}=2$. This would be the case for a UE with two antenna panels forming eight receive beams per panel, but where the UE is not capable of using the panels simultaneously.

Note that while the foregoing has generally described reception-based measurements from the perspective of a UE, the techniques described herein are equally applicable to transmission-based measurements by the UE (e.g., the transmission time of an SRS or other UL-PRS). In addition, the techniques described herein are equally applicable to reception-based and/or transmission-based measurements performed by a base station (or TRP or cell).

Figure 10:
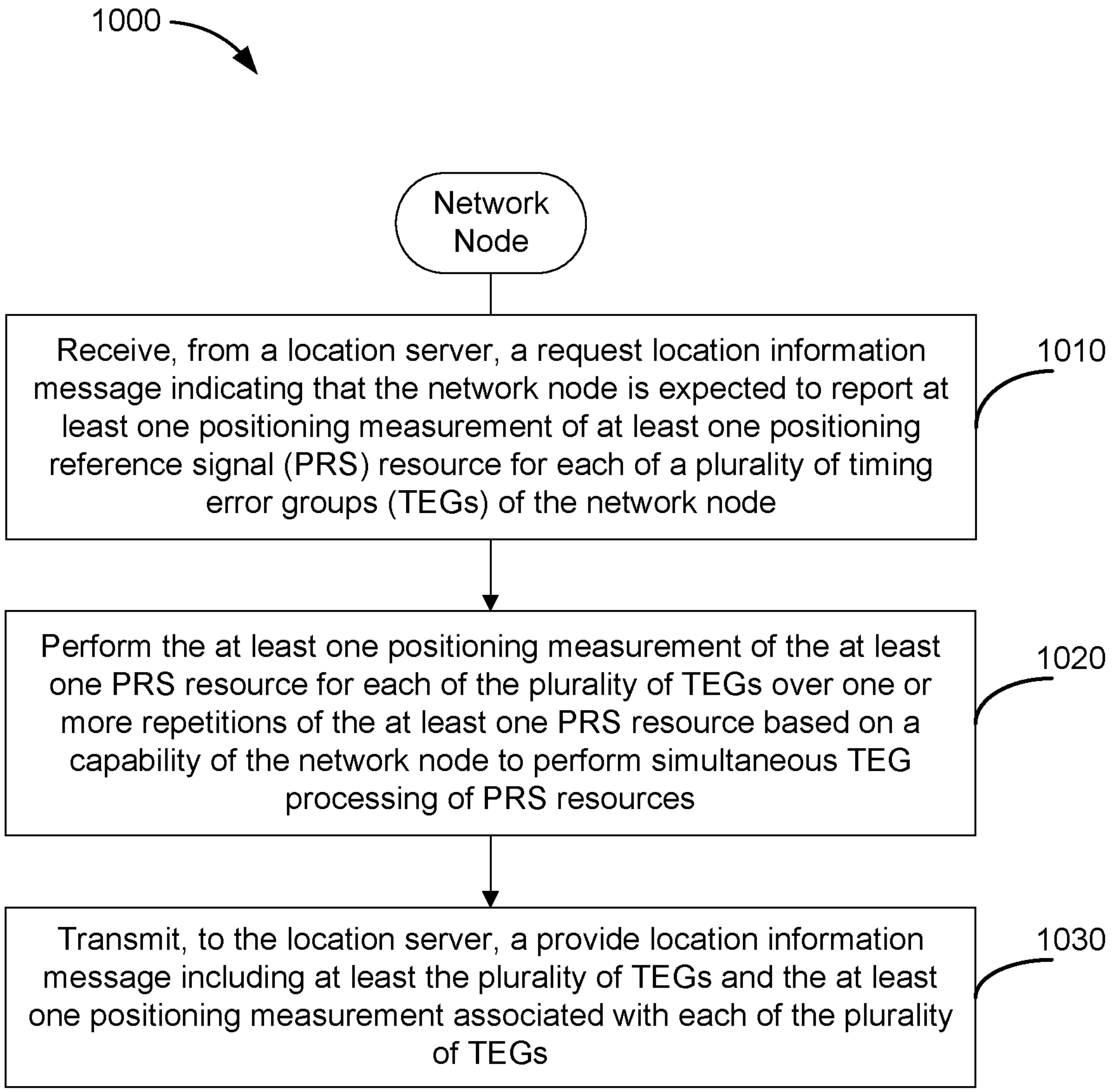
FIG. 10 illustrates an example method of wireless positioning, according to aspects of the disclosure.

FIG. 10 illustrates an example method 1000 of wireless positioning, according to aspects of the disclosure. In an aspect, method 1000 may be performed by a network node (e.g., any of the UEs or base stations described herein).

At 1010, the network node receives, from a location server (e.g., LMF 270), a request location information message (e.g., a LPP Request Location Information message as at stage 540) indicating that the network node is expected to report at least one positioning measurement (e.g., ToA, RSTD, Rx-Tx time difference, RSRP, etc.) of at least one PRS resource for each of a plurality of TEGs (e.g., Rx, Tx, or Rx and Tx TEGs) of the network node. In an aspect, where the network node is a UE, operation 1010 may be performed by the one or more WWAN transceivers 310, the one or more processors 332, memory 340, and/or positioning component 342, any or all of which may be considered means for performing this operation. In an aspect, where the network node is a base station, operation 1010 may be performed by the one or more WWAN transceivers 350, the one or more processors 384, memory 386, and/or positioning component 388, any or all of which may be considered means for performing this operation.

At 1020, the network node performs the at least one positioning measurement of the at least one PRS resource for each of the plurality of TEGs over one or more repetitions (e.g., measurement occasions) of the at least one PRS resource based on a capability of the network node to perform simultaneous TEG processing of PRS resources. In an aspect, where the network node is a UE, operation 1020 may be performed by the one or more WWAN transceivers 310, the one or more processors 332, memory 340, and/or positioning component 342, any or all of which may be considered means for performing this operation. In an aspect, where the network node is a base station, operation 1020 may be performed by the one or more WWAN transceivers 350, the one or more processors 384, memory 386, and/or positioning component 388, any or all of which may be considered means for performing this operation.

At 1030, the network node transmits, to the location server, a provide location information message (e.g., a LPP Provide Location Information message as at stage 560) including at least the plurality of TEGs and the at least one positioning measurement associated with each of the plurality of TEGs. In an aspect, where the network node is a UE, operation 1030 may be performed by the one or more WWAN transceivers 310, the one or more processors 332, memory 340, and/or positioning component 342, any or all of which may be considered means for performing this operation. In an aspect, where the network node is a base station, operation 1030 may be performed by the one or more WWAN transceivers 350, the one or more processors 384, memory 386, and/or positioning component 388, any or all of which may be considered means for performing this operation.

As will be appreciated, a technical advantage of the method 1000 is reduced latency due to the network node performing the at least one positioning measurement over a number of repetitions of the at least one PRS resource that is based on the capability of the network node to perform simultaneous TEG processing of PRS resources.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a network node, comprising: receiving, from a location server, a request location information message indicating that the network node is expected to report at least one positioning measurement of at least one positioning reference signal (PRS) resource for each of a plurality of timing error groups (TEGs) of the network node; performing the at least one positioning measurement of the at least one PRS resource for each of the plurality of TEGs over one or more repetitions of the at least one PRS resource based on a capability of the network node to perform simultaneous TEG processing of PRS resources; and transmitting, to the location server, a provide location information message including at least the plurality of TEGs and the at least one positioning measurement associated with each of the plurality of TEGs.

Clause 2. The method of clause 1, wherein: the network node is capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over one repetition of the at least one PRS resource.

Clause 3. The method of clause 2, further comprising: transmitting a provide location information message to the location server after the one repetition of the at least one PRS resource.

Clause 4. The method of clause 1, wherein: the network node is not capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over a plurality of repetitions of the at least one PRS resource.

Clause 5. The method of clause 4, wherein performing the at least one positioning measurement of the at least one PRS resource for each of the plurality of TEGs over the plurality of repetitions of the at least one PRS resource comprises: performing the at least one positioning measurement of the at least one PRS resource using a different TEG of the plurality of TEGs in each of the plurality of repetitions of the at least one PRS resource.

Clause 6. The method of any of clauses 4 to 5, further comprising: transmitting a provide location information message to the location server after the plurality of repetitions of the at least one PRS resource.

Clause 7. The method of any of clauses 1 to 6, wherein each of the plurality of TEGs is associated with a transmit beam or a receive beam used to perform the at least one positioning measurement of the at least one PRS resource for that TEG.

Clause 8. The method of any of clauses 1 to 7, wherein each of the plurality of TEGs is associated with a transmit antenna or a receive antenna used to perform the at least one positioning measurement of the at least one PRS resource for that TEG.

Clause 9. The method of any of clauses 1 to 8, further comprising: transmitting, to the location server, a provide capabilities message indicating capabilities of the network node to measure PRS resources for a positioning session, the provide capabilities message including at least one or more parameters indicating the capability of the network node to perform simultaneous TEG processing of PRS resources.

Clause 10. The method of clause 9, wherein the one or more parameters indicating the capability of the network node to perform simultaneous TEG processing of PRS resources are reported per frequency band or per frequency band combination.

Clause 11. The method of any of clauses 9 to 10, wherein the one or more parameters indicating the capability of the network node to perform simultaneous TEG processing of PRS resources include: a number of receive (Rx) TEGs supported per positioning frequency layer (PFL), a number of transmit (Tx) TEGs supported per PFL, a number of (Rx, Tx) TEG pairs supported per PFL, a number of Rx-Tx TEGs supported per PFL, a number of simultaneous Rx TEGs the network node can process per PFL, a number of simultaneous Tx TEGs the network node can process per PFL, a number of simultaneous (Rx, Tx) TEG pairs the network node can process per PFL, a number of simultaneous Rx-Tx TEGs the network node can process per PFL, or any combination thereof.

Clause 12. The method of any of clauses 1 to 11, wherein: the network node is a user equipment (UE), the at least one PRS resource comprises at least one downlink PRS resource, the at least one positioning measurement is based on a reception time of the at least one downlink PRS resource, the plurality of TEGs comprises a plurality of Rx TEGs, the request location information message is received via Long-Term Evolution (LTE) positioning protocol (LPP), and the provide location information message is transmitted via LPP.

Clause 13. The method of any of clauses 1 to 11, wherein: the network node is a UE, the at least one PRS resource comprises at least one sounding reference signal (SRS) resource, the at least one positioning measurement is based on a transmission time of the at least one SRS resource, the plurality of TEGs comprises a plurality of Tx TEGs, the request location information message is received via LPP, and the provide location information message is transmitted via LPP.

Clause 14. The method of any of clauses 1 to 11, wherein: the network node is a base station, the at least one PRS resource comprises at least one SRS resource, the at least one positioning measurement is based on a reception time of the at least one SRS resource, the plurality of TEGs comprises a plurality of Rx TEGs, the request location information message is received via New Radio positioning protocol type A (NRPPa), and the provide location information message is transmitted via NRPPa.

Clause 15. The method of any of clauses 1 to 11, wherein: the network node is a base station, the at least one PRS resource comprises at least one downlink PRS resource, the at least one positioning measurement is based on a transmission time of the at least one downlink PRS resource, the plurality of TEGs comprises a plurality of Tx TEGs, the request location information message is received via NRPPa, and the provide location information message is transmitted via NRPPa.

Clause 16. The method of any of clauses 1 to 15, wherein: a number of the one or more repetitions is based on a measurement period defined for the at least one positioning measurement, and a length of the measurement period is based on the capability of the network node to perform simultaneous TEG processing of PRS resources.

Clause 17. The method of clause 16, wherein the length of the measurement period being based on the capability of the network node to perform simultaneous TEG processing of PRS resources comprises the length of the measurement period being based on a factor related to the capability of the network node to perform simultaneous TEG processing of PRS resources.

Clause 18. The method of clause 17, wherein, for Frequency Range 1 (FR1): the factor is equal to one based on the network node having the capability to perform simultaneous TEG processing of PRS resources, or the factor is equal to a number of the plurality of TEGs based on the network node not having the capability to perform simultaneous TEG processing of PRS resources.

Clause 19. The method of any of clauses 17 to 18, wherein, for FR1, the factor is based on a number of a subset of the plurality of TEGs the network node can process per repetition of the at least one PRS resource.

Clause 20. The method of any of clauses 17 to 19, wherein, for Frequency Range 2 (FR2): the factor is equal to one based on the network node having the capability to perform simultaneous TEG processing of PRS resources, or the factor is equal to a number of antenna panels of the network node and the network node does not have the capability to perform simultaneous TEG processing of PRS resources on all of the antenna panels.

Clause 21. The method of any of clauses 1 to 20, wherein: a number of the one or more repetitions is based on a measurement period defined for the at least one positioning measurement, and a length of the measurement period is based on an assumption that the network node is not capable of performing simultaneous TEG processing of PRS resources.

Clause 22. The method of any of clauses 1 to 21, wherein: a number of the one or more repetitions is based on a measurement period defined for the at least one positioning measurement, and a length of the measurement period is based on an assumption that the network node is capable of performing simultaneous TEG processing of PRS resources.

Clause 23. A network node, comprising: a memory; at least one transceiver; and at least one processor communicatively coupled to the memory and the at least one transceiver, the at least one processor configured to: receive, via the at least one transceiver, from a location server, a request location information message indicating that the network node is expected to report at least one positioning measurement of at least one positioning reference signal (PRS) resource for each of a plurality of timing error groups (TEGs) of the network node; perform the at least one positioning measurement of the at least one PRS resource for each of the plurality of TEGs over one or more repetitions of the at least one PRS resource based on a capability of the network node to perform simultaneous TEG processing of PRS resources; and transmit, via the at least one transceiver, to the location server, a provide location information message including at least the plurality of TEGs and the at least one positioning measurement associated with each of the plurality of TEGs.

Clause 24. The network node of clause 23, wherein: the network node is capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over one repetition of the at least one PRS resource.

Clause 25. The network node of clause 24, wherein the at least one processor is further configured to: transmit, via the at least one transceiver, a provide location information message to the location server after the one repetition of the at least one PRS resource.

Clause 26. The network node of clause 23, wherein: the network node is not capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over a plurality of repetitions of the at least one PRS resource.

Clause 27. The network node of clause 26, wherein the at least one processor configured to perform the at least one positioning measurement of the at least one PRS resource for each of the plurality of TEGs over the plurality of repetitions of the at least one PRS resource comprises the at least one processor configured to: perform the at least one positioning measurement of the at least one PRS resource using a different TEG of the plurality of TEGs in each of the plurality of repetitions of the at least one PRS resource.

Clause 28. The network node of any of clauses 26 to 27, wherein the at least one processor is further configured to: transmit, via the at least one transceiver, a provide location information message to the location server after the plurality of repetitions of the at least one PRS resource.

Clause 29. The network node of any of clauses 23 to 28, wherein each of the plurality of TEGs is associated with a transmit beam or a receive beam used to perform the at least one positioning measurement of the at least one PRS resource for that TEG.

Clause 30. The network node of any of clauses 23 to 29, wherein each of the plurality of TEGs is associated with a transmit antenna or a receive antenna used to perform the at least one positioning measurement of the at least one PRS resource for that TEG.

Clause 31. The network node of any of clauses 23 to 30, wherein the at least one processor is further configured to: transmit, via the at least one transceiver, to the location server, a provide capabilities message indicating capabilities of the network node to measure PRS resources for a positioning session, the provide capabilities message including at least one or more parameters indicating the capability of the network node to perform simultaneous TEG processing of PRS resources.

Clause 32. The network node of clause 31, wherein the one or more parameters indicating the capability of the network node to perform simultaneous TEG processing of PRS resources are reported per frequency band or per frequency band combination.

Clause 33. The network node of any of clauses 31 to 32, wherein the one or more parameters indicating the capability of the network node to perform simultaneous TEG processing of PRS resources include: a number of receive (Rx) TEGs supported per positioning frequency layer (PFL), a number of transmit (Tx) TEGs supported per PFL, a number of (Rx, Tx) TEG pairs supported per PFL, a number of Rx-Tx TEGs supported per PFL, a number of simultaneous Rx TEGs the network node can process per PFL, a number of simultaneous Tx TEGs the network node can process per PFL, a number of simultaneous (Rx, Tx) TEG pairs the network node can process per PFL, a number of simultaneous Rx-Tx TEGs the network node can process per PFL, or any combination thereof.

Clause 34. The network node of any of clauses 23 to 33, wherein: the network node is a user equipment (UE), the at least one PRS resource comprises at least one downlink PRS resource, the at least one positioning measurement is based on a reception time of the at least one downlink PRS resource, the plurality of TEGs comprises a plurality of Rx TEGs, the request location information message is received via Long-Term Evolution (LTE) positioning protocol (LPP), and the provide location information message is transmitted via LPP.

Clause 35. The network node of any of clauses 23 to 33, wherein: the network node is a UE, the at least one PRS resource comprises at least one sounding reference signal (SRS) resource, the at least one positioning measurement is based on a transmission time of the at least one SRS resource, the plurality of TEGs comprises a plurality of Tx TEGs, the request location information message is received via LPP, and the provide location information message is transmitted via LPP.

Clause 36. The network node of any of clauses 23 to 33, wherein: the network node is a base station, the at least one PRS resource comprises at least one SRS resource, the at least one positioning measurement is based on a reception time of the at least one SRS resource, the plurality of TEGs comprises a plurality of Rx TEGs, the request location information message is received via New Radio positioning protocol type A (NRPPa), and the provide location information message is transmitted via NRPPa.

Clause 37. The network node of any of clauses 23 to 33, wherein: the network node is a base station, the at least one PRS resource comprises at least one downlink PRS resource, the at least one positioning measurement is based on a transmission time of the at least one downlink PRS resource, the plurality of TEGs comprises a plurality of Tx TEGs, the request location information message is received via NRPPa, and the provide location information message is transmitted via NRPPa.

Clause 38. The network node of any of clauses 23 to 37, wherein: a number of the one or more repetitions is based on a measurement period defined for the at least one positioning measurement, and a length of the measurement period is based on the capability of the network node to perform simultaneous TEG processing of PRS resources.

Clause 39. The network node of clause 38, wherein the length of the measurement period being based on the capability of the network node to perform simultaneous TEG processing of PRS resources comprises the length of the measurement period being based on a factor related to the capability of the network node to perform simultaneous TEG processing of PRS resources.

Clause 40. The network node of clause 39, wherein, for Frequency Range 1 (FR1): the factor is equal to one based on the network node having the capability to perform simultaneous TEG processing of PRS resources, or the factor is equal to a number of the plurality of TEGs based on the network node not having the capability to perform simultaneous TEG processing of PRS resources.

Clause 41. The network node of any of clauses 39 to 40, wherein, for FR1, the factor is based on a number of a subset of the plurality of TEGs the network node can process per repetition of the at least one PRS resource.

Clause 42. The network node of any of clauses 39 to 41, wherein, for Frequency Range 2 (FR2): the factor is equal to one based on the network node having the capability to perform simultaneous TEG processing of PRS resources, or the factor is equal to a number of antenna panels of the network node and the network node does not have the capability to perform simultaneous TEG processing of PRS resources on all of the antenna panels.

Clause 43. The network node of any of clauses 23 to 42, wherein: a number of the one or more repetitions is based on a measurement period defined for the at least one positioning measurement, and a length of the measurement period is based on an assumption that the network node is not capable of performing simultaneous TEG processing of PRS resources.

Clause 44. The network node of any of clauses 23 to 43, wherein: a number of the one or more repetitions is based on a measurement period defined for the at least one positioning measurement, and a length of the measurement period is based on an assumption that the network node is capable of performing simultaneous TEG processing of PRS resources.

Clause 45. A network node, comprising: means for receiving, from a location server, a request location information message indicating that the network node is expected to report at least one positioning measurement of at least one positioning reference signal (PRS) resource for each of a plurality of timing error groups (TEGs) of the network node; means for performing the at least one positioning measurement of the at least one PRS resource for each of the plurality of TEGs over one or more repetitions of the at least one PRS resource based on a capability of the network node to perform simultaneous TEG processing of PRS resources; and means for transmitting, to the location server, a provide location information message including at least the plurality of TEGs and the at least one positioning measurement associated with each of the plurality of TEGs.

Clause 46. The network node of clause 45, wherein: the network node is capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over one repetition of the at least one PRS resource.

Clause 47. The network node of clause 46, further comprising: means for transmitting a provide location information message to the location server after the one repetition of the at least one PRS resource.

Clause 48. The network node of clause 45, wherein: the network node is not capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over a plurality of repetitions of the at least one PRS resource.

Clause 49. The network node of clause 48, wherein the means for performing the at least one positioning measurement of the at least one PRS resource for each of the plurality of TEGs over the plurality of repetitions of the at least one PRS resource comprises: means for performing the at least one positioning measurement of the at least one PRS resource using a different TEG of the plurality of TEGs in each of the plurality of repetitions of the at least one PRS resource.

Clause 50. The network node of any of clauses 48 to 49, further comprising: means for transmitting a provide location information message to the location server after the plurality of repetitions of the at least one PRS resource.

Clause 51. The network node of any of clauses 45 to 50, wherein each of the plurality of TEGs is associated with a transmit beam or a receive beam used to perform the at least one positioning measurement of the at least one PRS resource for that TEG.

Clause 52. The network node of any of clauses 45 to 51, wherein each of the plurality of TEGs is associated with a transmit antenna or a receive antenna used to perform the at least one positioning measurement of the at least one PRS resource for that TEG.

Clause 53. The network node of any of clauses 45 to 52, further comprising: means for transmitting, to the location server, a provide capabilities message indicating capabilities of the network node to measure PRS resources for a positioning session, the provide capabilities message including at least one or more parameters indicating the capability of the network node to perform simultaneous TEG processing of PRS resources.

Clause 54. The network node of clause 53, wherein the one or more parameters indicating the capability of the network node to perform simultaneous TEG processing of PRS resources are reported per frequency band or per frequency band combination.

Clause 55. The network node of any of clauses 53 to 54, wherein the one or more parameters indicating the capability of the network node to perform simultaneous TEG processing of PRS resources include: a number of receive (Rx) TEGs supported per positioning frequency layer (PFL), a number of transmit (Tx) TEGs supported per PFL, a number of (Rx, Tx) TEG pairs supported per PFL, a number of Rx-Tx TEGs supported per PFL, a number of simultaneous Rx TEGs the network node can process per PFL, a number of simultaneous Tx TEGs the network node can process per PFL, a number of simultaneous (Rx, Tx) TEG pairs the network node can process per PFL, a number of simultaneous Rx-Tx TEGs the network node can process per PFL, or any combination thereof.

Clause 56. The network node of any of clauses 45 to 55, wherein: the network node is a user equipment (UE), the at least one PRS resource comprises at least one downlink PRS resource, the at least one positioning measurement is based on a reception time of the at least one downlink PRS resource, the plurality of TEGs comprises a plurality of Rx TEGs, the request location information message is received via Long-Term Evolution (LTE) positioning protocol (LPP), and the provide location information message is transmitted via LPP.

Clause 57. The network node of any of clauses 45 to 55, wherein: the network node is a UE, the at least one PRS resource comprises at least one sounding reference signal (SRS) resource, the at least one positioning measurement is based on a transmission time of the at least one SRS resource, the plurality of TEGs comprises a plurality of Tx TEGs, the request location information message is received via LPP, and the provide location information message is transmitted via LPP.

Clause 58. The network node of any of clauses 45 to 55, wherein: the network node is a base station, the at least one PRS resource comprises at least one SRS resource, the at least one positioning measurement is based on a reception time of the at least one SRS resource, the plurality of TEGs comprises a plurality of Rx TEGs, the request location information message is received via New Radio positioning protocol type A (NRPPa), and the provide location information message is transmitted via NRPPa.

Clause 59. The network node of any of clauses 45 to 55, wherein: the network node is a base station, the at least one PRS resource comprises at least one downlink PRS resource, the at least one positioning measurement is based on a transmission time of the at least one downlink PRS resource, the plurality of TEGs comprises a plurality of Tx TEGs, the request location information message is received via NRPPa, and the provide location information message is transmitted via NRPPa.

Clause 60. The network node of any of clauses 45 to 59, wherein: a number of the one or more repetitions is based on a measurement period defined for the at least one positioning measurement, and a length of the measurement period is based on the capability of the network node to perform simultaneous TEG processing of PRS resources.

Clause 61. The network node of clause 60, wherein the length of the measurement period being based on the capability of the network node to perform simultaneous TEG processing of PRS resources comprises the length of the measurement period being based on a factor related to the capability of the network node to perform simultaneous TEG processing of PRS resources.

Clause 62. The network node of clause 61, wherein, for Frequency Range 1 (FR1): the factor is equal to one based on the network node having the capability to perform simultaneous TEG processing of PRS resources, or the factor is equal to a number of the plurality of TEGs based on the network node not having the capability to perform simultaneous TEG processing of PRS resources.

Clause 63. The network node of any of clauses 61 to 62, wherein, for FR1, the factor is based on a number of a subset of the plurality of TEGs the network node can process per repetition of the at least one PRS resource.

Clause 64. The network node of any of clauses 61 to 63, wherein, for Frequency Range 2 (FR2): the factor is equal to one based on the network node having the capability to perform simultaneous TEG processing of PRS resources, or the factor is equal to a number of antenna panels of the network node and the network node does not have the capability to perform simultaneous TEG processing of PRS resources on all of the antenna panels.

Clause 65. The network node of any of clauses 45 to 64, wherein: a number of the one or more repetitions is based on a measurement period defined for the at least one positioning measurement, and a length of the measurement period is based on an assumption that the network node is not capable of performing simultaneous TEG processing of PRS resources.

Clause 66. The network node of any of clauses 45 to 65, wherein: a number of the one or more repetitions is based on a measurement period defined for the at least one positioning measurement, and a length of the measurement period is based on an assumption that the network node is capable of performing simultaneous TEG processing of PRS resources.

Clause 67. A non-transitory computer-readable medium storing computer-executable instructions that, when executed by a network node, cause the network node to: receive, from a location server, a request location information message indicating that the network node is expected to report at least one positioning measurement of at least one positioning reference signal (PRS) resource for each of a plurality of timing error groups (TEGs) of the network node; perform the at least one positioning measurement of the at least one PRS resource for each of the plurality of TEGs over one or more repetitions of the at least one PRS resource based on a capability of the network node to perform simultaneous TEG processing of PRS resources; and transmit, to the location server, a provide location information message including at least the plurality of TEGs and the at least one positioning measurement associated with each of the plurality of TEGs.

Clause 68. The non-transitory computer-readable medium of clause 67, wherein: the network node is capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over one repetition of the at least one PRS resource.

Clause 69. The non-transitory computer-readable medium of clause 68, further comprising instructions that, when executed by the network node, further cause the network node to: transmit a provide location information message to the location server after the one repetition of the at least one PRS resource.

Clause 70. The non-transitory computer-readable medium of clause 67, wherein: the network node is not capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over a plurality of repetitions of the at least one PRS resource.

Clause 71. The non-transitory computer-readable medium of clause 70, wherein the computer-executable instructions that, when executed by the network node, cause the network node to perform the at least one positioning measurement of the at least one PRS resource for each of the plurality of TEGs over the plurality of repetitions of the at least one PRS resource comprise computer-executable instructions that, when executed by the network node, cause the network node to: perform the at least one positioning measurement of the at least one PRS resource using a different TEG of the plurality of TEGs in each of the plurality of repetitions of the at least one PRS resource.

Clause 72. The non-transitory computer-readable medium of any of clauses 70 to 71, further comprising instructions that, when executed by the network node, further cause the network node to: transmit a provide location information message to the location server after the plurality of repetitions of the at least one PRS resource.

Clause 73. The non-transitory computer-readable medium of any of clauses 67 to 72, wherein each of the plurality of TEGs is associated with a transmit beam or a receive beam used to perform the at least one positioning measurement of the at least one PRS resource for that TEG.

Clause 74. The non-transitory computer-readable medium of any of clauses 67 to 73, wherein each of the plurality of TEGs is associated with a transmit antenna or a receive antenna used to perform the at least one positioning measurement of the at least one PRS resource for that TEG.

Clause 75. The non-transitory computer-readable medium of any of clauses 67 to 74, further comprising instructions that, when executed by the network node, further cause the network node to: transmit, to the location server, a provide capabilities message indicating capabilities of the network node to measure PRS resources for a positioning session, the provide capabilities message including at least one or more parameters indicating the capability of the network node to perform simultaneous TEG processing of PRS resources.

Clause 76. The non-transitory computer-readable medium of clause 75, wherein the one or more parameters indicating the capability of the network node to perform simultaneous TEG processing of PRS resources are reported per frequency band or per frequency band combination.

Clause 77. The non-transitory computer-readable medium of any of clauses 75 to 76, wherein the one or more parameters indicating the capability of the network node to perform simultaneous TEG processing of PRS resources include: a number of receive (Rx) TEGs supported per positioning frequency layer (PFL), a number of transmit (Tx) TEGs supported per PFL, a number of (Rx, Tx) TEG pairs supported per PFL, a number of Rx-Tx TEGs supported per PFL, a number of simultaneous Rx TEGs the network node can process per PFL, a number of simultaneous Tx TEGs the network node can process per PFL, a number of simultaneous (Rx, Tx) TEG pairs the network node can process per PFL, a number of simultaneous Rx-Tx TEGs the network node can process per PFL, or any combination thereof.

Clause 78. The non-transitory computer-readable medium of any of clauses 67 to 77, wherein: the network node is a user equipment (UE), the at least one PRS resource comprises at least one downlink PRS resource, the at least one positioning measurement is based on a reception time of the at least one downlink PRS resource, the plurality of TEGs comprises a plurality of Rx TEGs, the request location information message is received via Long-Term Evolution (LTE) positioning protocol (LPP), and the provide location information message is transmitted via LPP.

Clause 79. The non-transitory computer-readable medium of any of clauses 67 to 77, wherein: the network node is a UE, the at least one PRS resource comprises at least one sounding reference signal (SRS) resource, the at least one positioning measurement is based on a transmission time of the at least one SRS resource, the plurality of TEGs comprises a plurality of Tx TEGs, the request location information message is received via LPP, and the provide location information message is transmitted via LPP.

Clause 80. The non-transitory computer-readable medium of any of clauses 67 to 77, wherein: the network node is a base station, the at least one PRS resource comprises at least one SRS resource, the at least one positioning measurement is based on a reception time of the at least one SRS resource, the plurality of TEGs comprises a plurality of Rx TEGs, the request location information message is received via New Radio positioning protocol type A (NRPPa), and the provide location information message is transmitted via NRPPa.

Clause 81. The non-transitory computer-readable medium of any of clauses 67 to 77, wherein: the network node is a base station, the at least one PRS resource comprises at least one downlink PRS resource, the at least one positioning measurement is based on a transmission time of the at least one downlink PRS resource, the plurality of TEGs comprises a plurality of Tx TEGs, the request location information message is received via NRPPa, and the provide location information message is transmitted via NRPPa.

Clause 82. The non-transitory computer-readable medium of any of clauses 67 to 81, wherein: a number of the one or more repetitions is based on a measurement period defined for the at least one positioning measurement, and a length of the measurement period is based on the capability of the network node to perform simultaneous TEG processing of PRS resources.

Clause 83. The non-transitory computer-readable medium of clause 82, wherein the length of the measurement period being based on the capability of the network node to perform simultaneous TEG processing of PRS resources comprises the length of the measurement period being based on a factor related to the capability of the network node to perform simultaneous TEG processing of PRS resources.

Clause 84. The non-transitory computer-readable medium of clause 83, wherein, for Frequency Range 1 (FR1): the factor is equal to one based on the network node having the capability to perform simultaneous TEG processing of PRS resources, or the factor is equal to a number of the plurality of TEGs based on the network node not having the capability to perform simultaneous TEG processing of PRS resources.

Clause 85. The non-transitory computer-readable medium of any of clauses 83 to 84, wherein, for FR1, the factor is based on a number of a subset of the plurality of TEGs the network node can process per repetition of the at least one PRS resource.

Clause 86. The non-transitory computer-readable medium of any of clauses 83 to 85, wherein, for Frequency Range 2 (FR2): the factor is equal to one based on the network node having the capability to perform simultaneous TEG processing of PRS resources, or the factor is equal to a number of antenna panels of the network node and the network node does not have the capability to perform simultaneous TEG processing of PRS resources on all of the antenna panels.

Clause 87. The non-transitory computer-readable medium of any of clauses 67 to 86, wherein: a number of the one or more repetitions is based on a measurement period defined for the at least one positioning measurement, and a length of the measurement period is based on an assumption that the network node is not capable of performing simultaneous TEG processing of PRS resources.

Clause 88. The non-transitory computer-readable medium of any of clauses 67 to 87, wherein: a number of the one or more repetitions is based on a measurement period defined for the at least one positioning measurement, and a length of the measurement period is based on an assumption that the network node is capable of performing simultaneous TEG processing of PRS resources.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a network node, comprising:

receiving, from a location server, a request location information message indicating that the network node is expected to report at least one positioning measurement of at least one positioning reference signal (PRS) resource for each of a plurality of timing error groups (TEGs) of the network node;

performing the at least one positioning measurement of the at least one PRS resource for each of the plurality of TEGs over one or more repetitions of the at least one PRS resource based on a capability of the network node to perform simultaneous TEG processing of PRS resources, wherein a number of the one or more repetitions is based on a measurement period defined for the at least one positioning measurement, and wherein a length of the measurement period is based on the capability of the network node to perform simultaneous TEG processing of PRS resources; and transmitting, to the location server, a provide location information message including at least the plurality of TEGs and the at least one positioning measurement associated with each of the plurality of TEGs.

2. The method of claim 1, wherein:

the network node is capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over one repetition of the at least one PRS resource.

3. The method of claim 2, further comprising:

transmitting a provide location information message to the location server after the one repetition of the at least one PRS resource.

4. The method of claim 1, wherein:

the network node is not capable of performing simultaneous TEG processing of PRS resources, and performing the at least one positioning measurement of the at least one PRS resource for each of the plurality of TEGs comprises performing the at least one positioning measurement of the at least one PRS resource for each of the plurality of TEGs over a plurality of repetitions of the at least one PRS resource.

5. The method of claim 4, wherein performing the at least one positioning measurement of the at least one PRS resource for each of the plurality of TEGs over the plurality of repetitions of the at least one PRS resource comprises:

performing the at least one positioning measurement of the at least one PRS resource using a different TEG of the plurality of TEGs in each of the plurality of repetitions of the at least one PRS resource.

6. The method of claim 4, further comprising:

transmitting a provide location information message to the location server after the plurality of repetitions of the at least one PRS resource.

7. The method of claim 1, wherein each of the plurality of TEGs is associated with a transmit beam or a receive beam used to perform the at least one positioning measurement of the at least one PRS resource for that TEG.

8. The method of claim 1, wherein each of the plurality of TEGs is associated with a transmit antenna or a receive antenna used to perform the at least one positioning measurement of the at least one PRS resource for that TEG.

9. The method of claim 1, further comprising:

transmitting, to the location server, a provide capabilities message indicating capabilities of the network node to measure PRS resources for a positioning session, the provide capabilities message including at least one or more parameters indicating the capability of the network node to perform simultaneous TEG processing of PRS resources.

10. The method of claim 9, wherein the one or more parameters indicating the capability of the network node to perform simultaneous TEG processing of PRS resources are reported per frequency band or per frequency band combination.

11. The method of claim 9, wherein the one or more parameters indicating the capability of the network node to perform simultaneous TEG processing of PRS resources include:

a number of receive (Rx) TEGs supported per positioning frequency layer (PFL), a number of transmit (Tx) TEGs supported per PFL, a number of (Rx, Tx) TEG pairs supported per PFL, a number of Rx-Tx TEGs supported per PFL, a number of simultaneous Rx TEGs the network node can process per PFL, a number of simultaneous Tx TEGs the network node can process per PFL, a number of simultaneous (Rx, Tx) TEG pairs the network node can process per PFL, a number of simultaneous Rx-Tx TEGs the network node can process per PFL, or any combination thereof.

12. The method of claim 1, wherein:

the network node is a user equipment (UE), the at least one PRS resource comprises at least one downlink PRS resource, the at least one positioning measurement is based on a reception time of the at least one downlink PRS resource, the plurality of TEGs comprises a plurality of Rx TEGs, the request location information message is received via Long-Term Evolution (LTE) positioning protocol (LPP), and the provide location information message is transmitted via LPP.

13. The method of claim 1, wherein:

the network node is a UE, the at least one PRS resource comprises at least one sounding reference signal (SRS) resource, the at least one positioning measurement is based on a transmission time of the at least one SRS resource, the plurality of TEGs comprises a plurality of Tx TEGs, the request location information message is received via LPP, and the provide location information message is transmitted via LPP.

14. The method of claim 1, wherein:
the network node is a base station,
the at least one PRS resource comprises at least one SRS resource,
the at least one positioning measurement is based on a reception time of the at least one SRS resource,
the plurality of TEGs comprises a plurality of Rx TEGs,
the request location information message is received via New Radio positioning protocol type A (NRPPa), and
the provide location information message is transmitted via NRPPa.

15. The method of claim 1, wherein:
the network node is a base station,
the at least one PRS resource comprises at least one downlink PRS resource,
the at least one positioning measurement is based on a transmission time of the at least one downlink PRS resource,
the plurality of TEGs comprises a plurality of Tx TEGs,
the request location information message is received via NRPPa, and
the provide location information message is transmitted via NRPPa.

16. The method of claim 1, wherein the length of the measurement period being based on the capability of the network node to perform simultaneous TEG processing of PRS resources comprises the length of the measurement period being based on a factor related to the capability of the network node to perform simultaneous TEG processing of PRS resources.

17. The method of claim 16, wherein for Frequency Range 1 (FR1):
the factor is equal to one based on the network node having the capability to perform simultaneous TEG processing of PRS resources, or
the factor is equal to a number of the plurality of TEGs based on the network node not having the capability to perform simultaneous TEG processing of PRS resources.

18. The method of claim 16, wherein for FR1, the factor is based on a number of a subset of the plurality of TEGs the network node can process per repetition of the at least one PRS resource.

19. The method of claim 16, wherein for Frequency Range 2 (FR2):
the factor is equal to one based on the network node having the capability to perform simultaneous TEG processing of PRS resources, or
the factor is equal to a number of antenna panels of the network node and the network node does not have the capability to perform simultaneous TEG processing of PRS resources on all of the antenna panels.

20. A network node, comprising:
one or more memories;
one or more transceivers; and
one or more processors communicatively coupled to the one or more memories and the one or more transceivers, the one or more processors, either alone or in combination, configured to:
receive, via the one or more transceivers, from a location server, a request location information message indicating that the network node is expected to report at least one positioning measurement of at least one positioning reference signal (PRS) resource for each of a plurality of timing error groups (TEGs) of the network node;
perform the at least one positioning measurement of the at least one PRS resource for each of the plurality of TEGs over one or more repetitions of the at least one PRS resource based on a capability of the network node to perform simultaneous TEG processing of PRS resources, wherein a number of the one or more repetitions is based on a measurement period defined for the at least one positioning measurement, and wherein a length of the measurement period is based on the capability of the network node to perform simultaneous TEG processing of PRS resources; and
transmit, via the one or more transceivers, to the location server, a provide location information message including at least the plurality of TEGs and the at least one positioning measurement associated with each of the plurality of TEGs.

21. The network node of claim 20, wherein:
the network node is capable of performing simultaneous TEG processing of PRS resources, and
the one or more processors configured to perform the at least one positioning measurement of the at least one PRS resource for each of the plurality of TEGs comprises the one or more processors, either alone or in combination, configured to perform the at least one positioning measurement of the at least one PRS resource for each of the plurality of TEGs over one repetition of the at least one PRS resource.

22. The network node of claim 20, wherein:
the network node is not capable of performing simultaneous TEG processing of PRS resources, and
the one or more processors configured to perform the at least one positioning measurement of the at least one PRS resource for each of the plurality of TEGs comprises the one or more processors, either alone or in combination, configured to perform the at least one positioning measurement of the at least one PRS resource for each of the plurality of TEGs over a plurality of repetitions of the at least one PRS resource.

23. The network node of claim 20, wherein each of the plurality of TEGs is associated with a transmit beam or a receive beam used to perform the at least one positioning measurement of the at least one PRS resource for that TEG.

24. The network node of claim 20, wherein each of the plurality of TEGs is associated with a transmit antenna or a receive antenna used to perform the at least one positioning measurement of the at least one PRS resource for that TEG.

25. The network node of claim 20, wherein the one or more processors, either alone or in combination, are further configured to:
transmit, via the one or more transceivers, to the location server, a provide capabilities message indicating capabilities of the network node to measure PRS resources for a positioning session, the provide capabilities message including at least one or more parameters indicating the capability of the network node to perform simultaneous TEG processing of PRS resources.

26. The network node of claim 20, wherein:
the network node is a user equipment (UE),
the at least one PRS resource comprises at least one downlink PRS resource,
the at least one positioning measurement is based on a reception time of the at least one downlink PRS resource,
the plurality of TEGs comprises a plurality of Rx TEGs,
the request location information message is received via Long-Term Evolution (LTE) positioning protocol (LPP), and the provide location information message is transmitted via LPP.

27. The network node of claim 20, wherein:

the network node is a UE, the at least one PRS resource comprises at least one sounding reference signal (SRS) resource, the at least one positioning measurement is based on a transmission time of the at least one SRS resource, the plurality of TEGs comprises a plurality of Tx TEGs, the request location information message is received via LPP, and the provide location information message is transmitted via LPP.

28. The network node of claim 20, wherein:

the network node is a base station, the at least one PRS resource comprises at least one SRS resource, the at least one positioning measurement is based on a reception time of the at least one SRS resource, the plurality of TEGs comprises a plurality of Rx TEGs, the request location information message is received via New Radio positioning protocol type A (NRPPa), and the provide location information message is transmitted via NRPPa.

29. The network node of claim 20, wherein:

the network node is a base station, the at least one PRS resource comprises at least one downlink PRS resource, the at least one positioning measurement is based on a transmission time of the at least one downlink PRS resource, the plurality of TEGs comprises a plurality of Tx TEGs, the request location information message is received via NRPPa, and the provide location information message is transmitted via NRPPa.

30. A network node, comprising:

means for receiving, from a location server, a request location information message indicating that the network node is expected to report at least one positioning measurement of at least one positioning reference signal (PRS) resource for each of a plurality of timing error groups (TEGs) of the network node;

means for performing the at least one positioning measurement of the at least one PRS resource for each of the plurality of TEGs over one or more repetitions of the at least one PRS resource based on a capability of the network node to perform simultaneous TEG processing of PRS resources, wherein a number of the one or more repetitions is based on a measurement period defined for the at least one positioning measurement, and wherein a length of the measurement period is based on the capability of the network node to perform simultaneous TEG processing of PRS resources; and means for transmitting, to the location server, a provide location information message including at least the plurality of TEGs and the at least one positioning measurement associated with each of the plurality of TEGs.

31. A non-transitory computer-readable medium storing computer-executable instructions that, when executed by a network node, cause the network node to:

receive, from a location server, a request location information message indicating that the network node is expected to report at least one positioning measurement of at least one positioning reference signal (PRS) resource for each of a plurality of timing error groups (TEGs) of the network node;

perform the at least one positioning measurement of the at least one PRS resource for each of the plurality of TEGs over one or more repetitions of the at least one PRS resource based on a capability of the network node to perform simultaneous TEG processing of PRS resources, wherein a number of the one or more repetitions is based on a measurement period defined for the at least one positioning measurement, and wherein a length of the measurement period is based on the capability of the network node to perform simultaneous TEG processing of PRS resources; and transmit, to the location server, a provide location information message including at least the plurality of TEGs and the at least one positioning measurement associated with each of the plurality of TEGs.

* * * * *